United States Patent
Do et al.

(10) Patent No.: US 11,792,849 B2
(45) Date of Patent: Oct. 17, 2023

(54) METHODS FOR EFFICIENT USE OF UNLICENSED SPECTRUM

(71) Applicant: Telefonaktiebolaget LM Ericsson (publ), Stockholm (SE)

(72) Inventors: Tai Do, Lund (SE); Peter Alriksson, Hörby (SE); Thomas Nilsson, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 339 days.

(21) Appl. No.: 17/167,502

(22) Filed: Feb. 4, 2021

(65) Prior Publication Data

US 2021/0243804 A1 Aug. 5, 2021

Related U.S. Application Data

(63) Continuation of application No. 16/330,807, filed as application No. PCT/EP2018/085979 on Dec. 19, 2018, now Pat. No. 10,932,293.
(Continued)

(51) Int. Cl.
*H04W 16/14* (2009.01)
*H04W 74/08* (2009.01)
(Continued)

(52) U.S. Cl.
CPC ....... *H04W 74/0808* (2013.01); *H04L 5/0092* (2013.01); *H04L 27/2607* (2013.01); *H04W 16/14* (2013.01); *H04W 72/0453* (2013.01)

(58) Field of Classification Search
CPC ............. H04W 72/0808; H04W 16/14; H04W 72/0453; H04L 5/0092; H04L 27/2607
See application file for complete search history.

(56) References Cited

U.S. PATENT DOCUMENTS 10,448,366 B2   10/2019   Viorel et al.
2015/0163680 A1   6/2015   Valliappan et al.
(Continued)

FOREIGN PATENT DOCUMENTS

KR   20160055040 A   5/2016
KR   20160097226 A   8/2016
RU   2536858 C2   12/2014

OTHER PUBLICATIONS

Office Action for Canadian Patent Application No. 3088465, dated Aug. 10, 2021, 4 pages.
(Continued)

*Primary Examiner* — Melvin C Marcelo
(74) *Attorney, Agent, or Firm* — Withrow & Terranova, PLLC

(57) ABSTRACT

Systems and methods for efficient use of unlicensed spectrum are disclosed. In some embodiments, a method performed by a transmitter comprises performing a Listen-Before-Talk (LBT) procedure for a channels within a transmit bandwidth of the transmit node, where the transmit bandwidth is divided into a bandwidth parts that correspond to the channels. The method further comprises transmitting a transmission in a subset of the bandwidth parts that correspond to a subset of the channels determined, based on a result of the LBT procedure, to be available. Transmitting the transmission comprises transmitting the transmission in accordance with a transmit scheme that uses carrier aggregation and/or carrier merging to transmit the transmission on the subset of the bandwidth parts and uses resources in one or more guard bands between two or more adjacent bandwidth parts from among the subset of the bandwidth parts.

20 Claims, 20 Drawing Sheets

Related U.S. Application Data

(60) Provisional application No. 62/615,675, filed on Jan. 10, 2018.

(51) Int. Cl.
  *H04W 72/02* (2009.01)
  *H04L 5/00* (2006.01)
  *H04L 27/26* (2006.01)
  *H04W 72/0453* (2023.01)

(56) References Cited

U.S. PATENT DOCUMENTS

| | | |
|---|---|---|
| 2016/0021661 A1 | 1/2016 | Yerramalli et al. |
| 2017/0273056 A1 | 9/2017 | Papasakellariou |
| 2020/0221308 A1* | 7/2020 | Liao ..................... H04L 5/0041 |

OTHER PUBLICATIONS

Notice of Reasons for Refusal for Japanese Patent Application No. 2020-538133, dated Aug. 20, 2021, 52 pages.

Notice of Preliminary Rejection for Korean Patent Application No. 10-2020-7022886, dated May 27, 2021, 8 pages.

Ericsson, "R1-1811298: Frame structure for NR-U," Third Generation Partnership Project (3GPP), TSG-RAN WG1 Meeting #94bis, Oct. 8-12, 2018, 10 pages, Chengdu, China.

Ericsson, "R1-1813455: Frame structure for NR-U," Third Generation Partnership Project (3GPP) TSG-RAN WG1 Meeting #95, Nov. 12-16, 2018, 11 pages, Spokane, USA.

Nokia et al., "R4-1713781: Discussion on wideband operation," 3GPP TSG-WG Ran4 Meeting #85, Nov. 27-Dec. 1, 2017, Reno, USA, 3 pages.

Qualcomm Incorporated, "R4-1712183: Wideband and CA Operation for NR," 3GPP TSG-RAN#85, Nov. 27-Dec. 1, 2017, Reno, USA, 3 pages.

MCC Support, "R1-1708890: Final Report of 3GPP TSG RAN WG1 #88bis v1.0.0," Third Generation Partnership Project (3GPP) TSG RAN WG1 Meeting #89, May 15-19, 2017, 154 pages, Hangzhou, China.

International Search Report and Written Opinion for International Patent Application No. PCT/EP2018/085979, dated Apr. 5, 2019, 30 pages.

Decision to Grant for Russian Patent Application No. 2020126338/07, dated Dec. 9, 2020, 18 pages.

Non-Final Office Action for U.S. Appl. No. 16/330,807, dated Jun. 25, 2020, 7 pages.

\* cited by examiner

An interlacing design for NR-U with 20MHz bandwidth, 60 KHz subcarrier spacing, and 3 interlaces

*Embodiment A1, an interlacing design for carrier aggregation transmission*

Embodiment A2, an interlacing design for UL carrier merging transmission with extra PRBs in guard bands (covered by bold box)

*Embodiment A3, an interlacing design for UL carrier aggregation transmission with equal extra PRBs in guard bands (covered by bold boxes)*

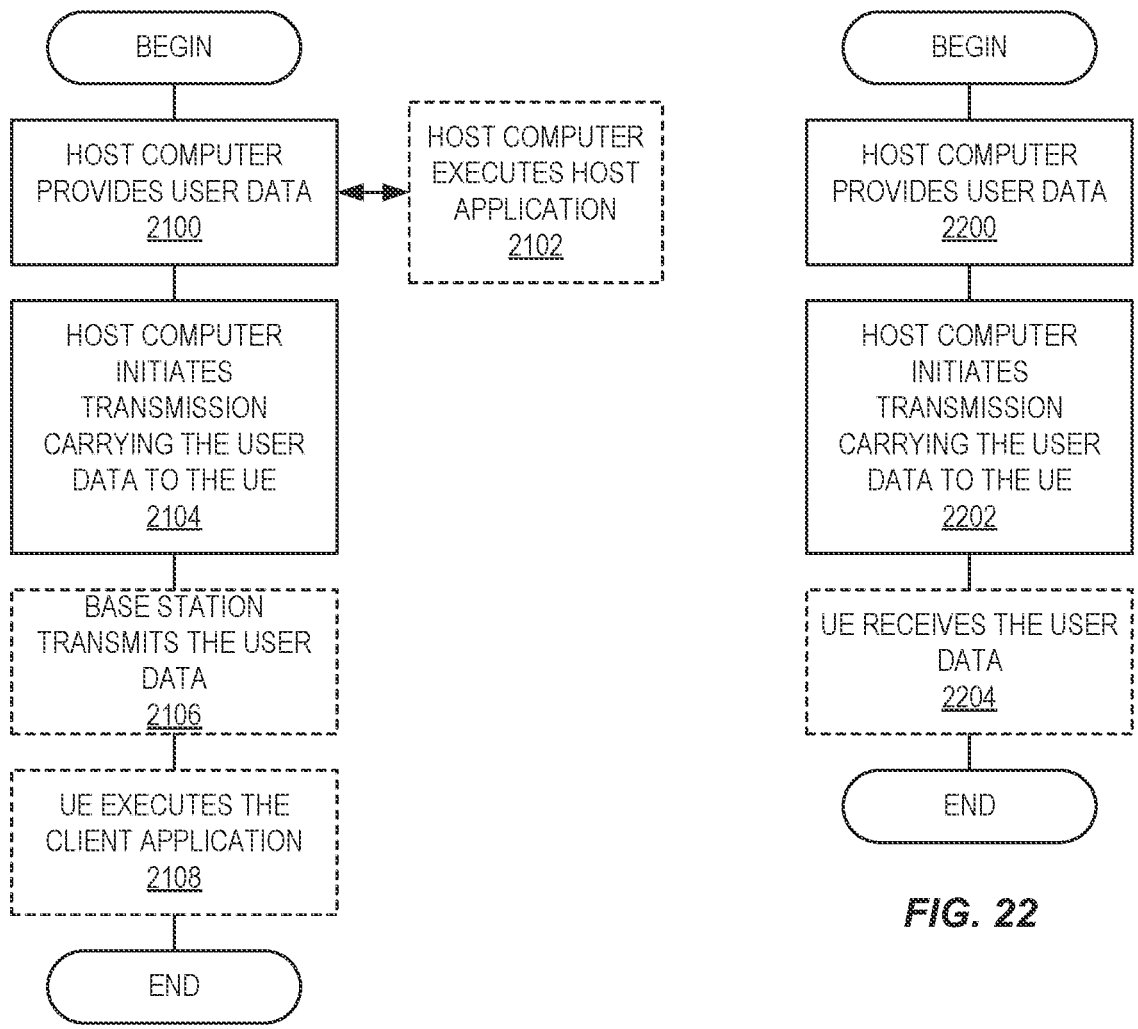

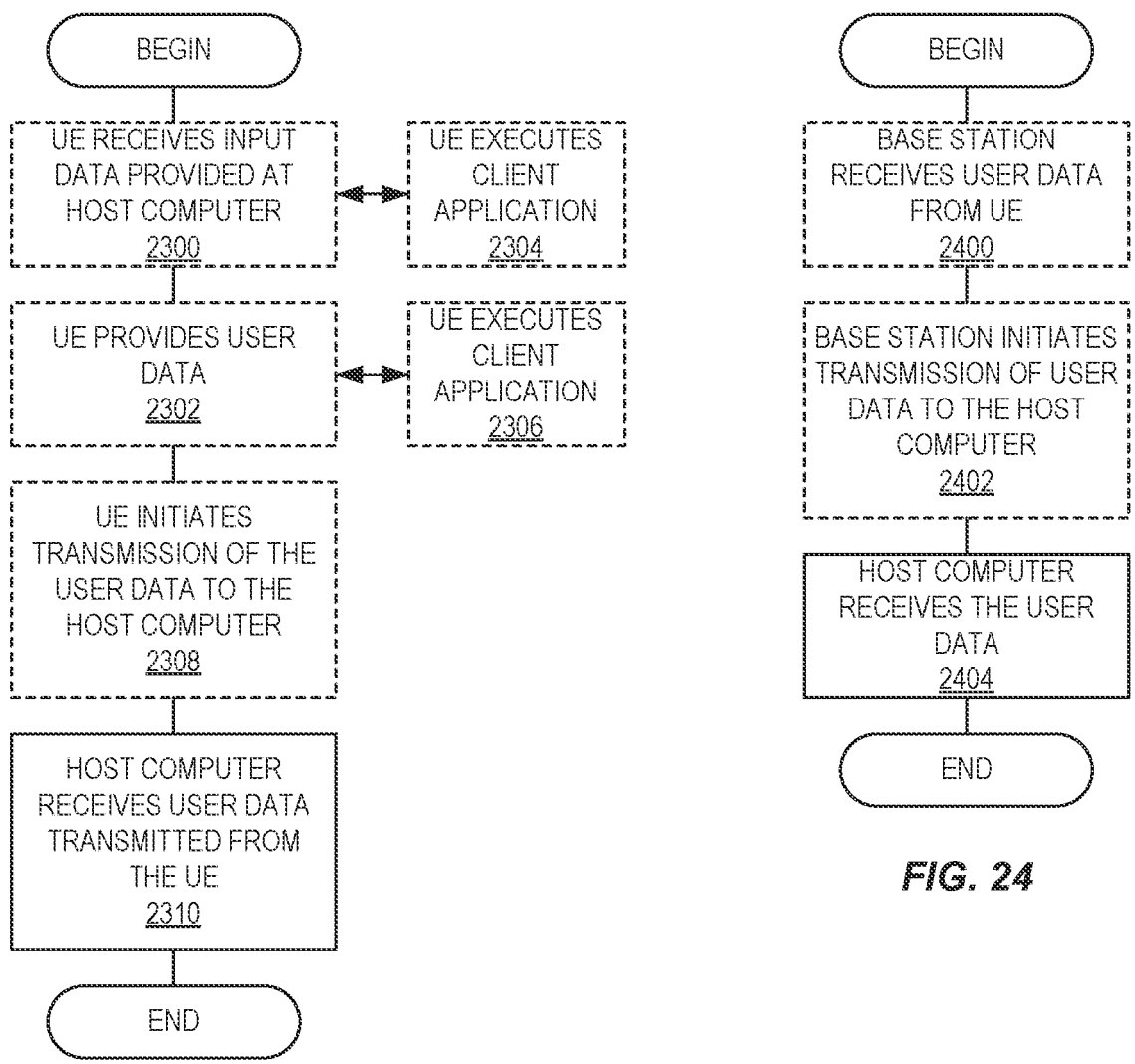

METHODS FOR EFFICIENT USE OF UNLICENSED SPECTRUM

This application is a continuation of U.S. patent application Ser. No. 16/330,807, filed Mar. 6, 2019, which is a 35 U.S.C. § 371 national phase filing of International Application No. PCT/EP2018/085979, filed Dec. 19, 2018, which claims the benefit of U.S. Provisional Application No. 62/615,675, filed Jan. 10, 2018, the disclosures of which are incorporated herein by reference in their entireties.

TECHNICAL FIELD

The present disclosure relates to cellular communication in unlicensed spectrum.

BACKGROUND

Currently the Fifth Generation (5G) of cellular system, called New Radio (NR) is being standardized in Third Generation Partnership Project (3GPP). NR is developed for maximum flexibility to support multiple and substantially different use cases, including the typical mobile broadband use case, but also including Machine Type Communication (MTC), Ultra-Low Latency Critical Communications (ULLCC), sidelink Device-To-Device (D2D), and several other use cases.

In NR, the basic scheduling unit is called a slot. A slot consists of 14 Orthogonal Frequency Division Multiplexing (OFDM) symbols for the normal Cyclic Prefix (CP) configuration. NR supports many different subcarrier spacing configurations and at a subcarrier spacing of 60 kilohertz (kHz) the OFDM symbol duration is ~16.7 microseconds (μs). As an example, a slot with 14 symbols for the same subcarrier-spacing is 250 μs long (including CPs).

NR also supports flexible bandwidth configurations for different User Equipment devices (UEs) on the same serving cell. In other words, the bandwidth monitored by a UE and used for its control and data channels may be smaller than the carrier bandwidth. One or multiple Bandwidth Part (BWP) configurations for each component carrier can be semi-statically signaled to a UE, where a BWP consists of a group of contiguous Physical Resource Blocks (PRBs). Reserved resources can be configured within the BWP. The bandwidth of a BWP equals or is smaller than the maximal bandwidth capability supported by a UE.

NR is targeting both licensed and unlicensed bands and a study item named NR Unlicensed (NR-U) is expected to start in early 2018. It is expected that some features in NR will need to be adapted to comply with the special characteristics of the unlicensed band as well as also different regulations. Subcarrier spacings of 60 or 30 kHz are the most promising candidates for NR-U OFDM numerologies for frequencies below 6 gigahertz (GHz).

The data unit that goes between the Medium Access Control (MAC) layer and the physical layer is called a transport block. The physical layer can transmit one or more transport blocks per slot. Each transport block has a Cyclic Redundancy Check (CRC) attached to it so that the receiver can determine if the transport block was correctly decoded or not. For coding efficiency reasons, large transport blocks need to be segmented into smaller code blocks. In Long Term Evolution (LTE) and NR, typical maximum code block sizes are in the range of some thousands of bits, whereas typical maximum transport block sizes are in the range of tens of thousands of bits. When a transport block is segmented into code blocks, each code block also has a CRC attached to it.

Traditionally radio access technologies developed by 3GPP have adopted Hybrid Automatic Repeat Request (HARQ) feedback per transport block. That is, even if only a single code block is in error, there is no way for the receiver to convey that information to the transmitter. Thus, the transmitter has no choice but to retransmit (possibly using a different redundancy version) the whole transport block. To improve this situation, NR has introduced a mechanism called code block group feedback. As the name suggests, the code blocks are grouped and feedback is sent for each group of code blocks. The NR base station (gNB) can configure the UE with the size of the code groups. Each code block group can potentially have different modulation and coding.

When operating in unlicensed spectrum, many regions in the world require a device to sense the medium as free before transmitting. This operation is often referred to as Listen-Before-Talk (LBT). There are many different variations of LBT, depending on which radio technology the device uses and which type of data it wants to transmit at the moment. Common for all variations of LBT is that the sensing is done in a particular channel (corresponding to a defined carrier frequency) and over a predefined bandwidth. For example, in the 5 GHz band, the sensing is done over 20 megahertz (MHz) channels.

Many devices are capable of transmitting (and receiving) over a bandwidth that is larger than the bandwidth of a single channel. A device is only allowed to transmit on the channels where the medium is sensed as free. Again, there are different flavors of how the sensing should be done when multiple channels are involved.

In principle, there are two ways a device can operate over multiple channels. One way is that the transmitter/receiver bandwidth is changed depending on which channels that were sensed as free. In this setup, there is only one processing chain and the multiple channels are treated as one channel with a larger bandwidth. The other way is that the device operates almost independent processing chains for each channel. Depending on how independent the two processing chains are, this option can be referred to as either Carrier Aggregation (CA) or dual connectivity.

In the Maximum Channel Occupancy Time (MCOT) concept the gNB is allowed to share its channel occupancy, after completing a long LBT, with uplink transmissions from UEs. One main goal with the introduction of the shared MCOT concept is to minimize the need of UEs to perform a long LBT prior to transmissions in the uplink. The scheduled UEs may perform a short LBT immediately following the downlink transmission. Another name for this concept is "Transmit Opportunity (TxOP)." The maximum length of a TxOP for various use cases are defined by European Telecommunications Standards Institute (ETSI) Broadband Radio Access Network (BRAN).

ETSI regulations mandate a limit on the Power Spectral Density (PSD) in the 5 GHz band to 10 decibel-milliwatts (dBm) per 1 MHz. The ETSI regulation defines the power density to be the mean Equivalent Isotropic Radiated Power (EIRP) over a transmission burst. In order to use the full output power for a smaller allocation a Block Interleaved Frequency Division Multiple Access (BI-FDMA) approach can be used. FIG. 1 shows an example of interlace design for NR-U. Assume that the bandwidth is 20 MHz and subcarrier spacing is 60 kHz, after taking into account the guard bands, the total number of effective PRBs is 24, each consisting of 12 subcarriers. Those PRBs are divided into N=3 interlaces, each interlace consisting of M=8 equally spaced PRBs. This design offers a good tradeoff between satisfying regulatory requirements on occupied bandwidth and transmit power spectral density, overhead required for resource allocation signaling, and the degradation in single-carrier properties of the signal.

SUMMARY

Systems and methods for efficient use of unlicensed spectrum are disclosed. Embodiments of a method performed by a transmitter to perform a transmission in a frequency spectrum requiring Listen-Before-Talk (LBT) are disclosed. In some embodiments, a method performed by a transmit node to perform a transmission in a frequency spectrum requiring LBT comprises performing a LBT procedure for a plurality of channels within a transmit bandwidth of the transmit node, where the transmit bandwidth is divided into a plurality of bandwidth parts that correspond to the plurality of channels. The method further comprises transmitting a transmission in a subset of the plurality of bandwidth parts that correspond to a subset of the plurality of channels determined, based on a result of the LBT procedure performed for the plurality of channels, to be available. Transmitting the transmission comprises transmitting the transmission in accordance with a transmit scheme that uses carrier aggregation and/or carrier merging to transmit the transmission on the subset of the plurality of bandwidth parts and uses resources in one or more guard bands between two or more adjacent bandwidth parts from among the subset of the plurality of bandwidth parts. In this manner, efficient use of the frequency spectrum is provided.

In some embodiments, the subset of the plurality of channels comprises at least two channels, and transmitting the transmission in the subset of the plurality of bandwidth parts comprises transmitting the transmission in the subset of the plurality of bandwidth parts in accordance with a carrier aggregation scheme.

In some embodiments, the subset of the plurality of channels comprises at least two adjacent channels from the plurality of channels, and transmitting the transmission in the subset of the plurality of bandwidth parts comprises transmitting the transmission in at least two adjacent bandwidth parts that correspond to the at least two adjacent channels in accordance with a carrier merging scheme that merges the at least two adjacent bandwidth parts and utilizes at least some resources in at least one guard band between the at least two adjacent bandwidth parts. In some other embodiments, resources in the plurality of bandwidth parts are logically divided into a plurality of interlaces, and the subset of the plurality of channels comprises at least two adjacent channels from the plurality of channels. Further, transmitting the transmission in the subset of the plurality of bandwidth parts comprises transmitting the transmission using one or more of the plurality of interlaces in at least two adjacent bandwidth parts that correspond to the at least two adjacent channels in accordance with a carrier merging scheme that merges the at least two adjacent bandwidth parts and utilizes at least some resources in at least one guard band between the at least two adjacent bandwidth parts, the at least some resources in the at least one guard band comprising resources that are allocated to at least one of the one or more interlaces on which the transmission is transmitted. Further, in some embodiments, the subset of the plurality of channels further comprises at least one channel from the plurality of channels that is not adjacent to the at least two adjacent channels, and transmitting the transmission in the subset of the plurality of bandwidth parts further comprises transmitting the transmission in: (a) at least two adjacent bandwidth parts that correspond to the at least two adjacent channels which are merged in accordance with a carrier merging scheme and (b) at least one bandwidth part that corresponds to the at least one channel that is not adjacent to the at least two adjacent bandwidth parts, in accordance with a carrier aggregation scheme.

In some embodiments, the subset of the plurality of channels comprises at least two adjacent channels from the plurality of channels, and transmitting the transmission in the subset of the plurality of bandwidth parts comprises transmitting the transmission in at least two adjacent bandwidth parts that correspond to the at least two adjacent channels in accordance with a carrier aggregation scheme that utilizes at least some resources in one or more guard bands between the at least two adjacent bandwidth parts.

In some embodiments, resources in the plurality of bandwidth parts are logically divided into a plurality of interlaces, and the subset of the plurality of channels comprises at least two adjacent channels from the plurality of channels. Further, transmitting the transmission in the subset of the plurality of bandwidth parts comprises transmitting the transmission using one or more of the plurality of interlaces in at least two adjacent bandwidth parts that correspond to the at least two adjacent channels in accordance with a carrier aggregation scheme that utilizes at least some resources in one or more guard bands between the at least two adjacent bandwidth parts that are allocated to at least one of the one or more interlaces on which the transmission is transmitted.

In some embodiments, the transmit scheme utilizes an interlace design that defines multiple interlaces in each of the plurality of bandwidth parts, and resources in at least one of the guard bands allocated for a particular interlace are assigned to the same wireless device that is occupying the corresponding interlace within the plurality of bandwidth parts.

In some embodiments, the transmit scheme utilizes an interlace design that defines multiple interlaces in each of the plurality of bandwidth parts, and the interlace design offsets a central frequency for at least one of the plurality of bandwidth parts such that there is subcarrier level alignment between the plurality of interlaces on the plurality of bandwidth parts.

In some embodiments, the transmit scheme utilizes an interlace design that defines multiple interlaces in each of the plurality of bandwidth parts, and the interlace design offsets a central frequency for at least one of the plurality of bandwidth parts such that there is Physical Resource Block (PRB) level alignment between the plurality of interlaces on the plurality of bandwidth parts.

In some embodiments, when generating the transmission, a Fast Fourier Transform (FFT) size that can support the transmit bandwidth of the transmit node is used for all possible outcomes of the LBT procedure for the plurality of channels.

In some embodiments, a maximum supported bandwidth of the transmit node is preconfigured for the transmit node or signaled to the transmit node.

In some embodiments, the transmit node is a wireless device, and the method further comprises receiving, from a network node, signaling of a code rate, modulation order, and at least one interlace to be used for the transmission. In some embodiments, the method further comprises adapting a transport block size for the transmission based on the number of available channels as determined by the LBT procedure performed for the plurality of channels and/or whether extra resources in the guard band(s) between adjacent available channels are to be used for the uplink transmission.

In some other embodiments, a method performed by a transmit node to perform transmission in a frequency spectrum requiring LBT comprises performing a LBT procedure for a plurality of channels within a transmit bandwidth of the transmit node, where the transmit bandwidth is divided into a plurality of bandwidth parts that correspond to the plurality of channels. The method further comprises, during a first part of a Transmit Opportunity (TxOP), transmitting in a subset of the plurality of bandwidth parts that correspond to a subset of the plurality of channels determined, based on a result of the LBT procedure performed for the plurality of channels, to be available. Transmitting during the first part of the TxOP comprises transmitting during the first part of the TxOP in accordance with a first transmit scheme that does not utilize resources within guard bands between adjacent bandwidth parts. The method further comprises, during a second part of the TxOP, transmitting in the subset of the plurality of bandwidth parts, wherein transmitting during the second part of the TxOP comprises transmitting during the second part of the TxOP in accordance with a second transmit scheme that utilizes resources within one or more guard bands between two or more of the subset of the plurality of bandwidth parts that are adjacent to one another. In some embodiments, the first transmit scheme and the second transmit scheme utilize interlace designs that define a plurality of interlaces in each of the plurality of bandwidth parts.

In some embodiments, the first transmit scheme is a carrier aggregation scheme utilized to transmit during the first part of the TxOP in the subset of the plurality of bandwidth parts that correspond to the subset of the plurality of channels determined to be available. In some embodiments, the second transmit scheme is a combination of a carrier aggregation scheme and a carrier merging scheme utilized to transmit during the second part of the TxOP in the subset of the plurality of bandwidth parts that correspond to the subset of the plurality of channels determined to be available and the resources within the one or more guard bands between the two or more of the subset of the plurality of bandwidth parts that are adjacent to one another. In some other embodiments, the second transmit scheme is a carrier aggregation scheme utilized to transmit during the second part of the TxOP in the subset of the plurality of bandwidth parts that correspond to the subset of the plurality of channels determined to be available. In some other embodiments, the second transmit scheme is a carrier merging scheme utilized to transmit during the second part of the TxOP in the subset of the plurality of bandwidth parts that correspond to the subset of the plurality of channels determined to be available.

In some embodiments, the first transmit scheme is a carrier aggregation scheme utilized to transmit during the first part of the TxOP in the subset of the plurality of bandwidth parts that correspond to the subset of the plurality of channels determined to be available, and the second transmit scheme is a carrier merging scheme utilized to transmit during the second part of the TxOP in the subset of the plurality of bandwidth parts that correspond to the subset of the plurality of channels determined to be available.

In some embodiments, the method further comprises, prior to completing the LBT procedure, generating transport blocks for transmission during the first part of the TxOP and mapping the transport blocks for transmission during the first part of the TxOP to the plurality of bandwidth parts. In some embodiments, the method further comprises, after completing the LBT procedure, generating transport blocks for transmission during the second part of the TxOP and mapping the transport blocks for transmission during the second part of the TxOP to the subset of the plurality of bandwidth parts that correspond to the subset of the plurality of channels determined to be available.

In some embodiments, the method further comprises, prior to completing the LBT procedure, generating code blocks for transmission during both the first part of the TxOP and the second part of the TxOP and mapping the code blocks to the plurality of bandwidth parts, wherein the first transmit scheme and the second transmit scheme utilize carrier merging or a combination of carrier aggregation and carrier merging to transmit during the respective part of the TxOP in the subset of the plurality of bandwidth parts that correspond to the subset of the plurality of channels determined to be available.

In some embodiments, a timing of a switch point between the first part of the TxOP and the second part of the TxOP is preconfigured.

Embodiments of a method performed by a receiver to receive a transmission in a frequency spectrum requiring LBT are also disclosed. In some embodiments, a method performed by a receiver to receive a transmission in a frequency spectrum requiring LBT comprises receiving, from a transmit node, a transmission in a subset of a plurality of bandwidth parts of a transmit bandwidth of the transmit node that correspond to a subset of a plurality of channels within the transmit bandwidth of the transmit node that are available for transmission. Receiving the transmission comprises receiving the transmission in accordance with a respective transmit scheme, where the transmit scheme utilizes carrier aggregation and/or carrier merging to transmit the transmission on the subset of the plurality of bandwidth parts and utilizes resources in one or more guard bands between two or more adjacent bandwidth parts from among the subset of the plurality of bandwidth parts.

In some embodiments, the method further comprises preconfiguring the transmit node or signaling a configuration to the transmit node with one or more parameters that indicate at least one interlace to be used by the transmit node for transmission of the transmit node.

In some embodiments, the method further comprises performing a LBT procedure for a set of channels comprising the plurality of channels within the transmit bandwidth of the transmit node to thereby determine two or more available channels from among the plurality of channels within the transmit bandwidth of the transmit node, and signaling, to the transmit node, an indication of the two or more available channels.

In some embodiments, the transmission shares a channel occupancy of an associated transmission from the receiver.

In some other embodiments, a method performed by a receiver to receive a transmission in a frequency spectrum requiring LBT comprises receiving a first part of a transmission from a transmit node during a first part of a TxOP in a subset of a plurality of bandwidth parts of a transmit bandwidth of the transmit node that correspond to a subset of a plurality of channels within the transmit bandwidth of the transmit node that are available for the transmission. The first part of the transmission during the first part of the TxOP is in accordance with a first transmit scheme that does not utilize resources within guard bands between adjacent bandwidth parts. The method further comprises receiving a second part of the transmission from the transmit node during a second part of the TxOP in the subset of the plurality of bandwidth parts, wherein the second part of the transmission during the second part of the TxOP is in accordance with a second transmit scheme that utilizes resources within one or more guard bands between two or more of the subset of the plurality of bandwidth parts that are adjacent to one another.

In some embodiments, the method further comprises signaling, to the transmit node, an indication of a timing of a switch point between the first part of the TxOP and the second part of the TxOP.

Embodiments of a transmit node and embodiments of a receive node are also disclosed.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 21 through 24 are flowcharts illustrating methods implemented in a communication system in accordance with various embodiments of the present disclosure.

DETAILED DESCRIPTION

Figure 1:
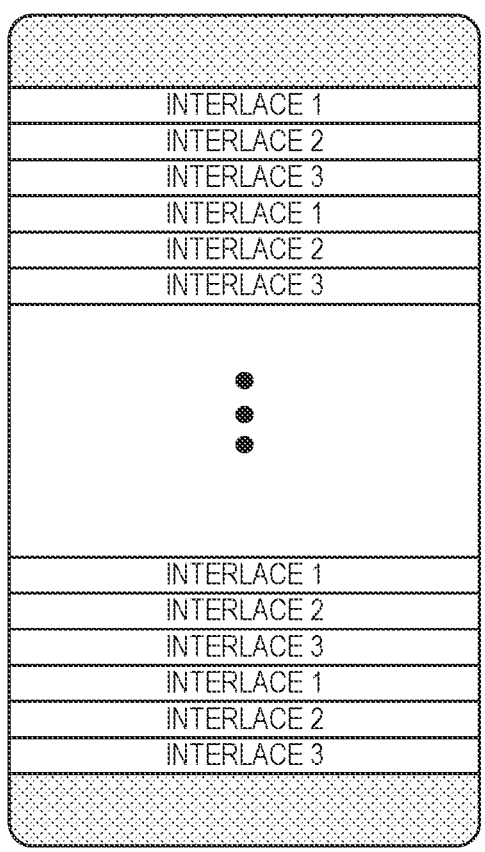
FIG. 1 shows an example of interlace design for New Radio Unlicensed (NR-U)

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to 5G NR concepts, beams may be used instead of cells and, as such, it is important to note that the concepts described herein are equally applicable to both cells and beams.

As discussed above in the Background section, in principle, there are two ways a device can operate over multiple channels. One way (referred to below as the "first option") is that the transmitter/receiver bandwidth is changed depending on which channels that were sensed as free. In this setup, there is only one processing chain and the multiple channels are treated as one channel with a larger bandwidth. The other way (referred to below as the "second option") is that the device operates almost independent processing chains for each channel. Depending on how independent the two processing chains are, this option can be referred to as either Carrier Aggregation (CA) or dual connectivity.

There currently exist certain challenge(s). In this regard, a number of problems are discussed below.

First Problems: When the device uses the first option, i.e. it uses one processing chain and treats the multiple channels as one channel with larger bandwidth, problems occur if some of the channels are not sensed as free. In particular, the time from when the channel sensing is done to when the transmitter needs to start its transmission is in general very short. According to the regulations in European Telecommunications Standards Institute (ETSI), the transmitter needs to start its transmission no more than 16 microseconds (µs) after the channel sensing. Otherwise, it has to perform channel sensing again. This leaves little room for re-encoding the transport block(s) that the transmitter had planned to transmit to match the available channels.

When the device uses the second option, i.e. it uses multiple processing chains and treats the multiple channels as independent channels, the device must then be equipped with multiple processing chains. Moreover, since the multiple channels are treated as independent channels, the device preserves some guard bands between them, which become unnecessary and inefficient when contiguous channels are used by the same device.

Using the first option has the benefit of lower power consumption and simpler implementation as only one processing chain is used, whereas using the second option gives more flexibility when it comes to scheduling and retransmissions.

Current interlace designs are static, tailored for a fixed bandwidth, and do not support dynamically changing bandwidths. Thus, there is a need for a flexible interlace design supporting both transmission options and allowing efficient use of available bandwidth when contiguous channels are used by the same device.

Moreover, when the interlacing transmissions are used, different devices may share the same Bandwidth Parts (BWPs) (different devices use different interlaces but in the same frequency range). Potential conflict can occur if different devices simultaneously fill up the guard bands between adjacent channels without a good interlace design or pre-configuration.

Second Problems: When the device uses the first option, i.e. it uses one processing chain and treats the multiple channels as one channel with larger bandwidth, problems occur if some of the channels are not sensed as free. In particular, the time from when the channel sensing is done to when the transmitter needs to start its transmission is in general very short. According to the regulations in ETSI, the transmitter needs to start its transmission no more than 16 µs after the channel sensing. Otherwise, it has to perform channel sensing again. This leaves little room for re-encoding the transport block(s) that the transmitter had planned to transmit to match the available channels.

Using prior art methods, the transmitter would be forced to not transmit on the channels that were sensed as busy. The receiver would then not be able to decode the transport block correctly and thus would send a Negative Acknowledgement (NACK) to the transmitter. The transmitter would then have to wait for the response from the receiver and retransmit the full transport block again where the same problem could occur again.

When the device uses the second option, i.e. it uses multiple processing chains and treats the multiple channels as independent channels, the device must then be equipped with multiple processing chains. Moreover, since the multiple channels are treated as independent channels, the device preserves some guard bands between them, which become unnecessary and inefficient when contiguous channels are used by the same device.

Using the first option has the benefit of lower power conception as only one processing chain is used and better spectrum utilization as no guard band is needed, whereas using the second option gives more flexibility when it comes to scheduling and retransmissions. Thus there is a need for a method to dynamically switch between option one and option two.

Certain aspects of the present disclosure and their embodiments may provide solutions to the aforementioned or other challenges. There are, proposed herein, various embodiments which address one or more of the issues disclosed herein.

In some embodiments, interlacing designs are proposed and utilized to support different transmission options on different available bandwidths and, in some embodiments, fill up unnecessary guard bands between adjacent channels.

Interlacing designs are proposed and utilized which can be flexibly applied for different available bandwidths. The proposed interlace designs allow for better radio resource utilization (bandwidth, transmit power) and shorter delays.

In some embodiments, systems and methods are disclosed in which the Transmit Opportunity (TxOP) is divided into two parts:
  In the first part of TxOP after Listen-Before-Talk (LBT), a fast and simple transmission scheme with unfilled guard band(s) is used.
  In the second part of the TxOP, a transmission scheme filling the guard band(s) is used.

The wider bandwidth is divided into several BWPs. The devices perform LBT per BWP then transmit based on the available BWPs.
  Each TxOP is divided into two parts:
  First part of TxOP: the device transmits the transport blocks, which are prepared in advance, on the available BWPs with guard bands between BWPs.
  Second part of TxOP: the device switches to the new transmission mode and fills up the guard bands between adjacent BWPs.

Certain embodiments may provide one or more of the following technical advantage(s):
  The proposed methods allow for better radio resource utilization and shorter delays. The unnecessary guard bands between contiguous channels can be used and the radio resources (bandwidth, power) are used more efficiently.
  Some embodiments allow for less stringent processing requirements, because transport blocks can be prepared in advance, instead of preparing the transport blocks after it is known which channels are free.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 2:
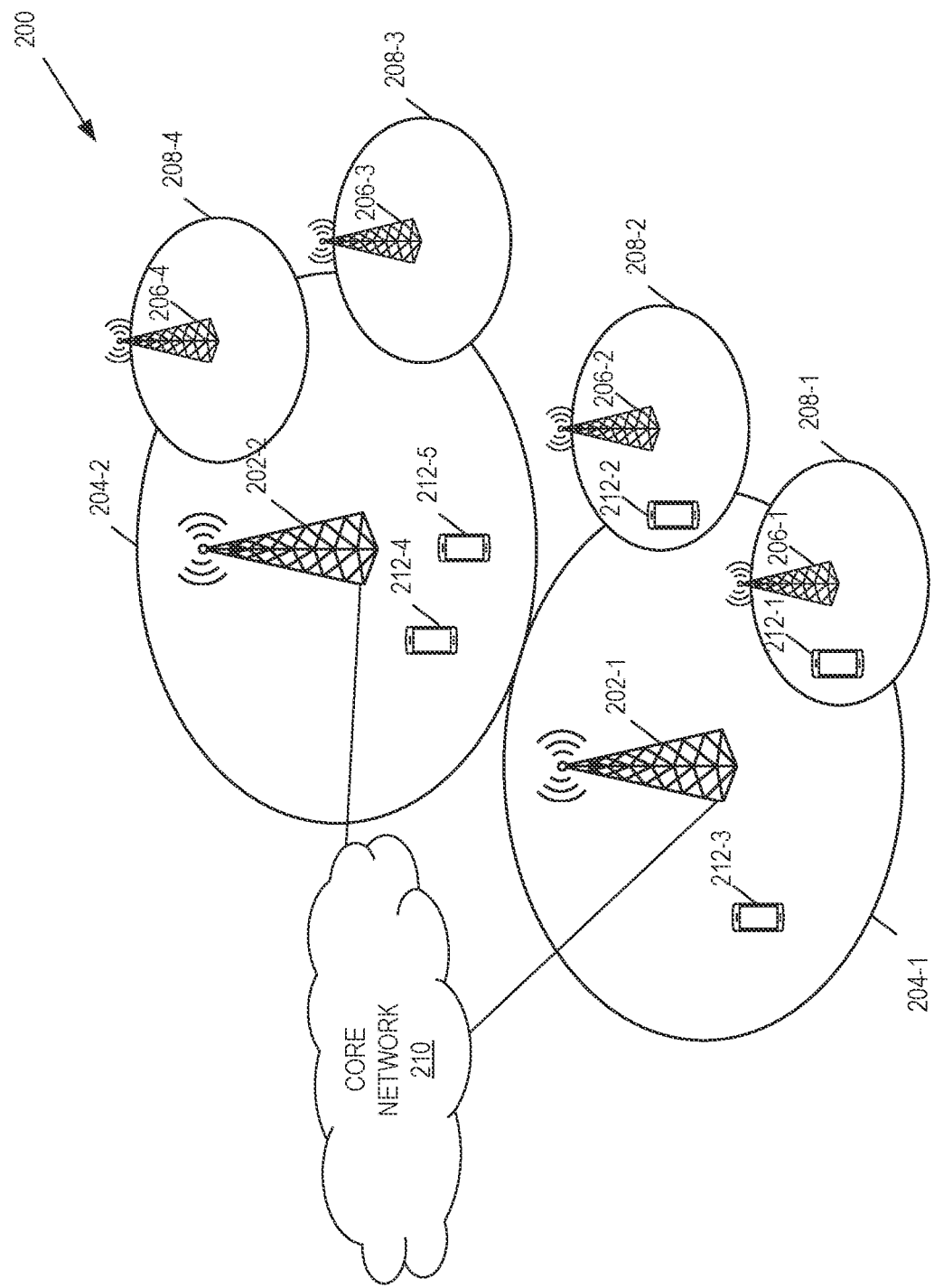
FIG. 2 illustrates one example of a cellular communications network according to some embodiments of the present disclosure.

FIG. 2 illustrates one example of a cellular communications network 200 in which embodiments of the present disclosure may be implemented. In the embodiments described herein, the cellular communications network 200 is a 5G NR network. In this example, the cellular communications network 200 includes base stations 202-1 and 202-2, which in LTE are referred to as eNBs and in 5G NR are referred to as gNBs, controlling corresponding macro cells 204-1 and 204-2. The base stations 202-1 and 202-2 are generally referred to herein collectively as base stations 202 and individually as base station 202. Likewise, the macro cells 204-1 and 204-2 are generally referred to herein collectively as macro cells 204 and individually as macro cell 204. The cellular communications network 200 may also include a number of low power nodes 206-1 through 206-4 controlling corresponding small cells 208-1 through 208-4. The low power nodes 206-1 through 206-4 can be small base stations (such as pico or femto base stations) or Remote Radio Heads (RRHs), or the like. Notably, while not illustrated, one or more of the small cells 208-1 through 208-4 may alternatively be provided by the base stations 202. The low power nodes 206-1 through 206-4 are generally referred to herein collectively as low power nodes 206 and individually as low power node 206. Likewise, the small cells 208-1 through 208-4 are generally referred to herein collectively as small cells 208 and individually as small cell 208. The base stations 202 (and optionally the low power nodes 206) are connected to a core network 210.

The base stations 202 and the low power nodes 206 provide service to wireless devices 212-1 through 212-5 in the corresponding cells 204 and 208. The wireless devices 212-1 through 212-5 are generally referred to herein collectively as wireless devices 212 and individually as wireless device 212. The wireless devices 212 are also sometimes referred to herein as UEs.

At some of the base stations 202 and/or the low power nodes 206 operate in a frequency spectrum (e.g., unlicensed frequency spectrum) that requires LBT.

A number of embodiments are described below. While described separately, these embodiments may be used in any desired combination.

1 Interlace Design

Embodiments of an interlace design are described below and are referred to herein as embodiments A1 through A7. This interlace design is utilized by a wireless device 212 (also referred to as a UE) to perform an uplink transmission on a particular interlace(s) after performing an LBT procedure on multiple channels within an uplink bandwidth of the wireless device 212. In some embodiments, the LBT procedure is a short LBT procedure, where a base station 202 or low power node 206 shares its channel occupancy (e.g., via the Maximum Channel Occupancy Time (MCOT) concept) with the wireless device 212 for the uplink transmission. The details of the LBT procedure and the MCOT concept are well known to those of skill in the art and, as such, will not be further described herein.

1.1 Embodiment A1

In embodiment A1, an interlacing design is considered for uplink CA transmission in which the wider uplink bandwidth of the wireless device 212 is divided into several BWPs. The interlaces are designed for each BWP and the same interlacing design is used for all BWPs.

Figure 3:
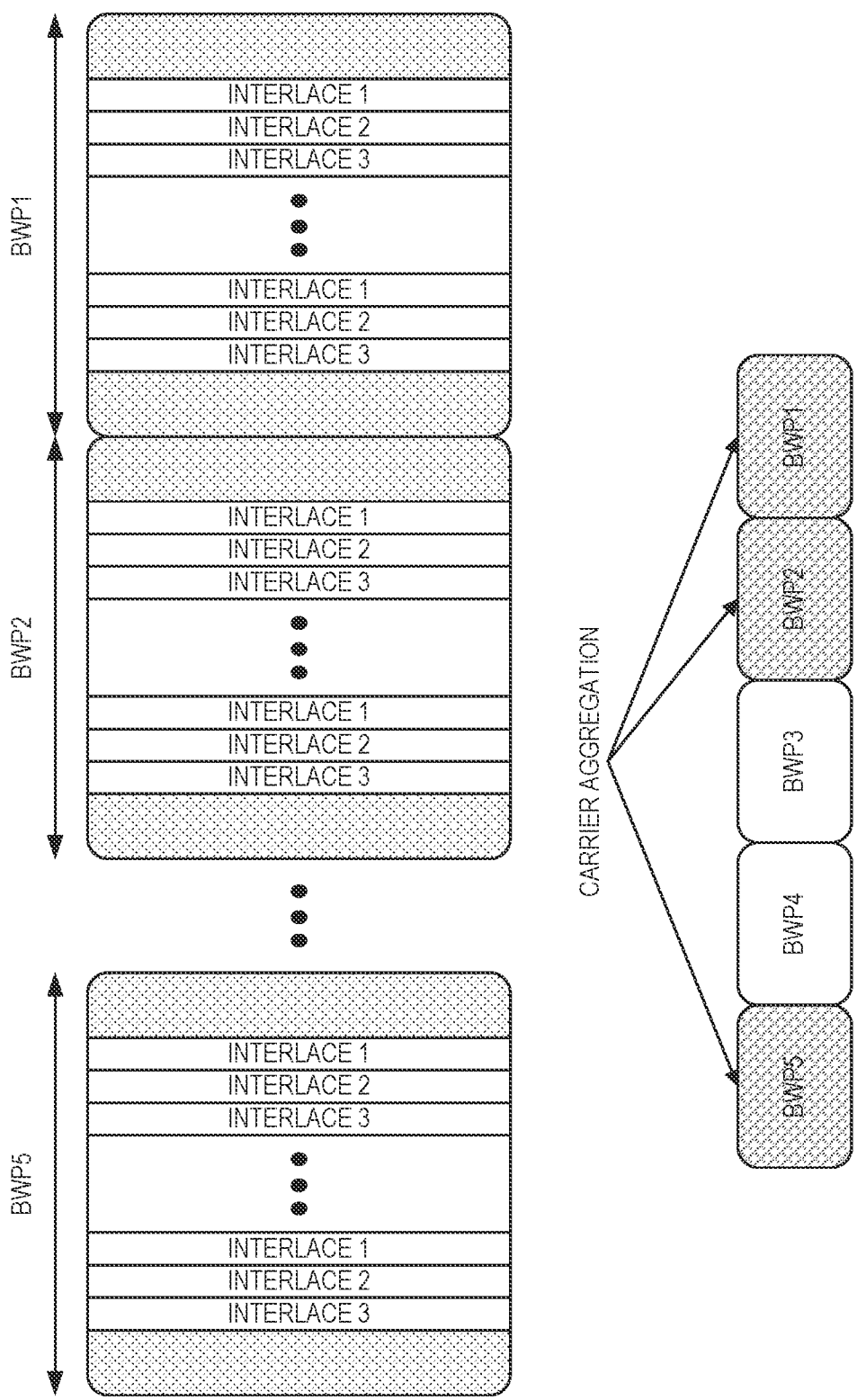
FIG. 3 illustrates an example of an interlacing design in accordance with one embodiment of the present disclosure.

FIG. 3 illustrates an example of the interlacing design for embodiment A1. This design includes guard bands between adjacent BWPs. The guard bands between adjacent BWPs are represented by the areas having a dot fill pattern. As illustrated, within each BWP, there are three interlaces, in this example. Further, in this example, using LBT, the wireless device 212 determines that the channels corresponding to BWP1, BWP2, and BWP5 are available for uplink transmission. The wireless device 212 performs an uplink transmission using a respective interlace(s) within BWP1, BWP2, and BWP5 using CA.

Note that for many of the embodiments described herein, it is assumed that there is one LBT channel per BWP. However, the present disclosure is not limited thereto. For example, one or more of the BWPs may include two or more LBT channels where, e.g., the BWP is utilized if all associated LBT channels are determined to be available (i.e., free). As another example, one LBT channel may extend over two or more BWPs.

1.2 Embodiment A2

In embodiment A2, an interlacing design is proposed for carrier merging transmission in which the contiguous (also referred to herein as adjacent) free BWPs are merged into a wider BWP and extra Physical Resource Blocks (PRBs) are allocated in the guard band of adjacent BWPs. Note that while carrier merging is oftentimes described herein as merging adjacent, free BWPs, it is should be understood that, for the transmission, carriers that correspond to the merged BWPs are merged to provide a single carrier for the merged BWPs. The transmission is then performed using this single carrier (and possibly additional carriers for non-adjacent, free BWPs using CA).

Assume that the interlace is designed based on a PRB unit. In some embodiments, a PRB unit is 12 subcarriers. However, in some other embodiments, a PRB unit could be more or less than 12 subcarriers. The maximum number K1 of extra PRBs which can be used to fill up the unnecessary guard bands between two adjacent BWPs can be calculated as $K1=\text{floor}(\text{Guard BW/BW per PRB}).$ For example, with 20 megahertz (MHz) BWPs, a subcarrier spacing of 60 kilohertz (kHz) and a total of 24 PRBs available for allocation, the guard bandwidth is 2,720 kHz, and the number of extra PRBs for each adjacent BWP will be $K1=\text{floor}(2720/(12*60))=2$.

Figure 4:
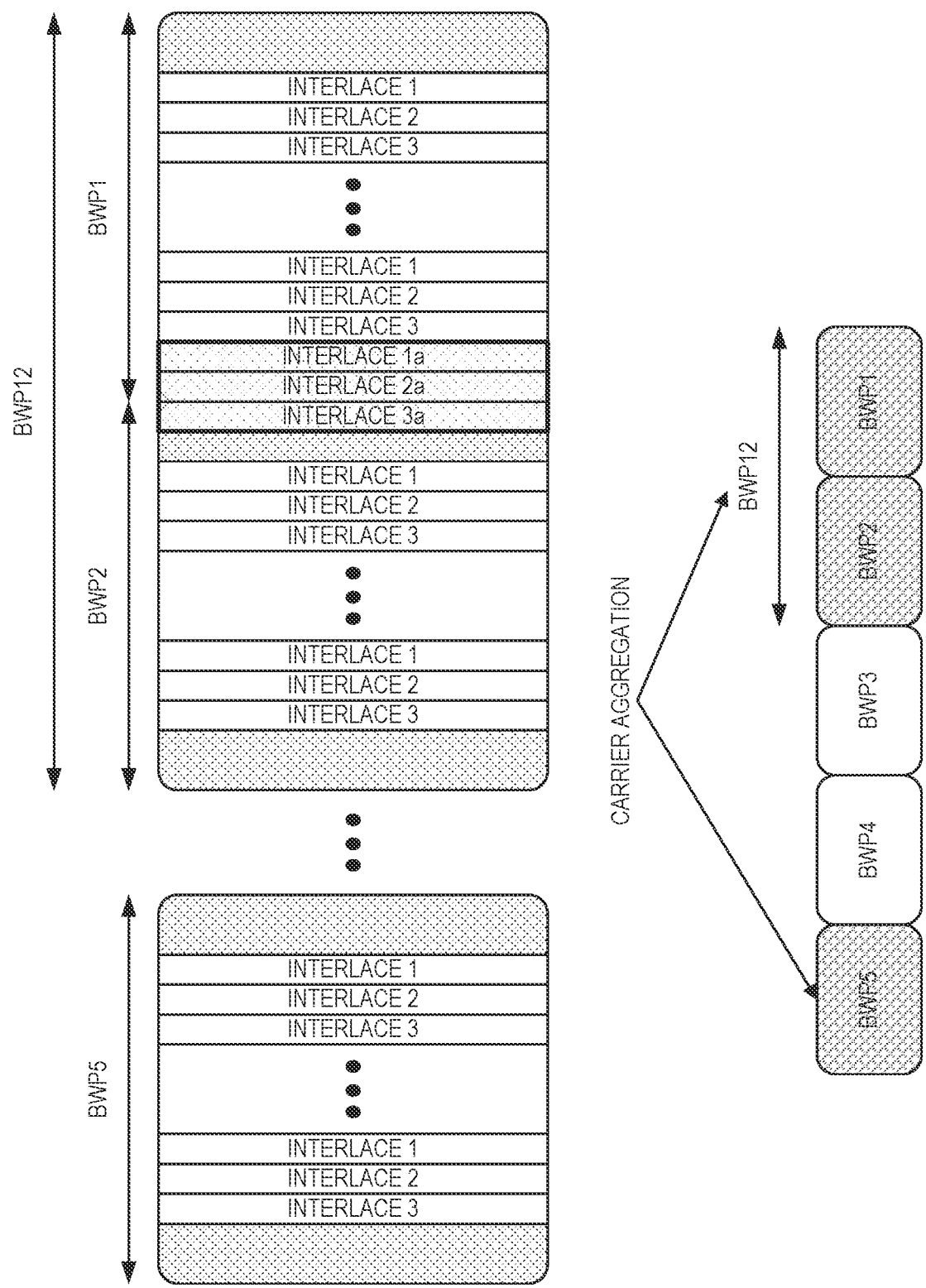
FIG. 4 illustrates an example of an interlacing design in accordance with another embodiment of the present disclosure.

FIG. 4 illustrates an example of the interlacing design for embodiment A2. Again, the guard bands are represented by the areas having a dot fill pattern. As illustrated, within each BWP, there are three interlaces, in this example. This design includes some optional extra PRBs in the guard bands between adjacent BWPs (interlaces 1a, 2a, 3a in FIG. 4). Those optional extra PRBs can be used if the adjacent BWPs are sensed free by the same wireless device 212.

In order to avoid the conflict between different wireless devices sensing different channel availabilities, the extra PRBs (interlaces 1a, 2a, 3a in FIG. 4) can be assigned to the same wireless devices who are occupying the corresponding interlaces (interlaces 1, 2, 3 in FIG. 4).

Further, in this example, using LBT, the wireless device 212 determines that the channels corresponding to BWP1, BWP2, and BWP5 are available for uplink transmission. The wireless device 212 performs an uplink transmission using a respective interlace(s) within BWP1, BWP2, and BWP5 using a combination of carrier merging and CA. Specifically, carrier merging is used to merge the carriers of BWP1 and BWP2 into a merged carrier for BWP12 (i.e., a single carrier that spans the merged BWP12). The wireless device 212 transmits the uplink transmission in both BWP12 and BWP5 using a CA scheme (i.e., using both the merged carrier of BWP12 and the carrier of BWP5).

In the example in FIG. 4, the transmissions on contiguous BWPs (BWP1 and BWP2) are carrier merging and non-contiguous BWPs (BWP12 and BWP5) are CA. However, it is also possible to merge non-contiguous BWPs and use only one processing chain for the transmissions on them.

1.3 Embodiment A3

In embodiment A3, the transmission is done using CA as in embodiment A1, but in case the same wireless device 212 gains access to two (or more) adjacent channels, the wireless device 212 transmits data on the resource blocks for its interlace(s) in the guard band. In one option, the extra PRBs can be allocated equally for each BWP. The maximum number K2 of extra PRBs which can be used to fill up the unnecessary guard band in each side of a BWP is $$K2=\text{floor}(\text{Guard BW}/(2*\text{BW per PRB})).$$

For example, with 20 MHz BWPs, a subcarrier spacing of 60 kHz and a total of 24 PRBs available for allocation, the guard bandwidth is 2,720 kHz, and the number of extra PRBs for each adjacent BWPs will be K1=floor(2720/(2*12*60))=1.

Figure 5:
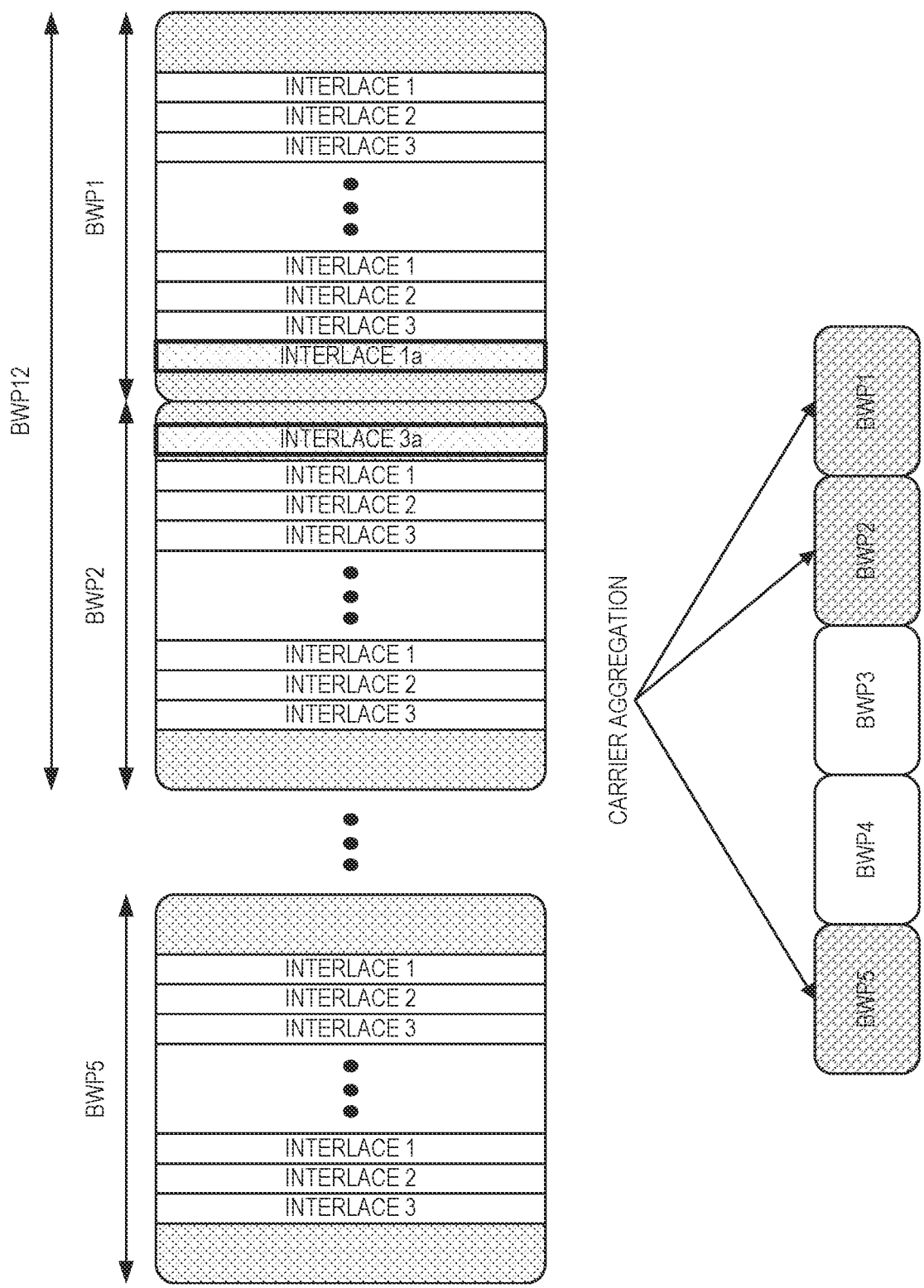
FIG. 5 illustrates an example of an interlacing design in accordance with another embodiment of the present disclosure.

FIG. 5 illustrates one example of the interlacing design for embodiment A3. Again, the guard bands are represented by the areas having a dot fill pattern. As illustrated, within each BWP, there are three interlaces, in this example. Further, in this example, using LBT, the wireless device 212 determines that the channels corresponding to BWP1, BWP2, and BWP5 are available for uplink transmission. The wireless device 212 performs an uplink transmission using a respective interlace(s) within BWP1, BWP2, and BWP5 using CA. In this embodiment, the wireless device 212 also uses PRBs of the respective interlace(s) within the guard bands of adjacent BWPs, which are BWP1 and BWP2 in the example of FIG. 5.

Another option is that the extra PRBs are allocated unequally to the BWPs. One BWP could get more extra PRBs than the other one. In this option, the maximum number of extra PRBs which can be used to fill up the unnecessary guard bands between two adjacent BWPs can be calculated as K1 in embodiment A2.

1.4 Embodiment A4

In embodiment A4, the central frequencies (or the positions of interlaces) of BWPs can be slightly offset to have subcarrier level alignment between interlaces in different BWPs. This could simplify the processing implementation at the transmitter when different BWPs are merged and used for a single processing chain. This subcarrier alignment is also useful at avoiding inter-carrier interference when CA is used and increasing the spectral efficiency by using more or all subcarriers in guard bands.

The frequency offsets can be in different directions for adjacent BWPs to avoid accumulating offsets so that the interlaces (except the extra PRBs in guard bands) in each BWP are still within the effective transmit band region, i.e., not across the guard bands. This can be done since the frequency offsets are relatively small (smaller than subcarrier spacing).

For example, in the example of FIG. 3 wherein there are five BWPs of 20 MHz each and a subcarrier spacing 60 kHz, the distance between two adjacent BWPs is 333.33 subcarriers. Assume that the position of the central BWP, i.e., BWP3 is fixed, then subcarrier alignment can be achieved by i) moving BWP2 and BWP4 closer to BWP3 by an offset of 0.33*60=20 kHz and ii) moving BWP1 and BWP5 in the other direction (further from BWP3) by an offset of (1−0.33−0.33)*60=20 kHz.

In addition to or as an alternative to subcarrier alignment, the central frequencies (or the positions of the interlaces) of BWPs can be offset to have PRB level alignment between interlaces in different BWPs. In other words, using FIG. 4 as an example, the central frequencies or the positions of the interlaces of the BWPs can be offset such that frequency offset between non-guard band portion of BWP1 and the adjacent edge of the non-guard band portion of BWP2 is equal to m PRBs, where m is a positive integer that is greater than or equal to 1. For instance, in some embodiments, the guard band of each BWP is equal to m PRBs, where m is a positive integer that is greater than or equal to 1. In additional to PRB level alignment, the index of interlaces in each BWP can be cyclic-shifted so that the PRBs of the same interlace (i.e., interlaces with the same index) in all BWPs are uniformly distributed.

1.5 Embodiment A5

In embodiment A5, when carrier merging transmission is used, a large Fast Fourier Transform (FFT) size (i.e., a FFT size that can support the maximum uplink bandwidth of the UE) can be used and unchanged for all possible LBT outcomes. In certain subcarriers, where the channels are busy or the interlaces are assigned to other UEs, zero power/null symbols can be mapped to them.

As one example, a FFT size of 4,096 which is proposed for NR and can support up to 200 MHz bandwidth for waveform with subcarrier spacing 60 kHz.

1.6 Embodiment A6

In embodiment A6, the maximum supported bandwidth of each wireless device 212 can be preconfigured or signaled to the wireless device 212 via an uplink grant. The former option (i.e., preconfiguration) requires less overhead but is less flexible since the supported uplink bandwidth for each wireless device could be changed due to the LBT's outcome at the radio access node 202 (gNB for 5G NR).

For example with 5 BWPs as in the example of FIG. 3, in the first option, the wireless device 212 is preconfigured (e.g., based on the capability of the wireless device 212 when the connection is set up) to be allowed to transmit on all available channels between BWP1 and BWP5. Then, the wireless device 212 will transmit on BWP1, BWP3, and BWP5 if it senses the channels are free on those BWPs regardless of the sensing results at the radio access node 202 (and the uplink grant need not include the allowed bandwidth). In the second option, the allowed BWPs are signaled in each uplink grant. For instance, if the radio access node 202 only schedules the wireless device 212 on BWP1 and BWP5 (e.g., due to the LBT's outcome at the radio access node 202), then in the uplink grant the wireless device 212 can only transmit on BWP1 and BWP5 even if the wireless device 212 senses that the channel is also free on BWP3.

This can help to reduce the hidden node problem but requires more overhead in the uplink grant.

1.7 Embodiment A7

In one embodiment, the radio access node 202 (gNB in 5G NR) signals the coding rate, modulation order, and which interlaces to use to the wireless device 212. The wireless device 212 then adapts the transport block size based on the number of available channels and/or if a channel has been extended into the guard band. The radio access node 202 then detects on which carriers/resource blocks the wireless device 212 transmitted and computes the transport block size accordingly.

1.8 Example Process for Utilizing the Interlace Design of Embodiments A1-A7

Figure 6:
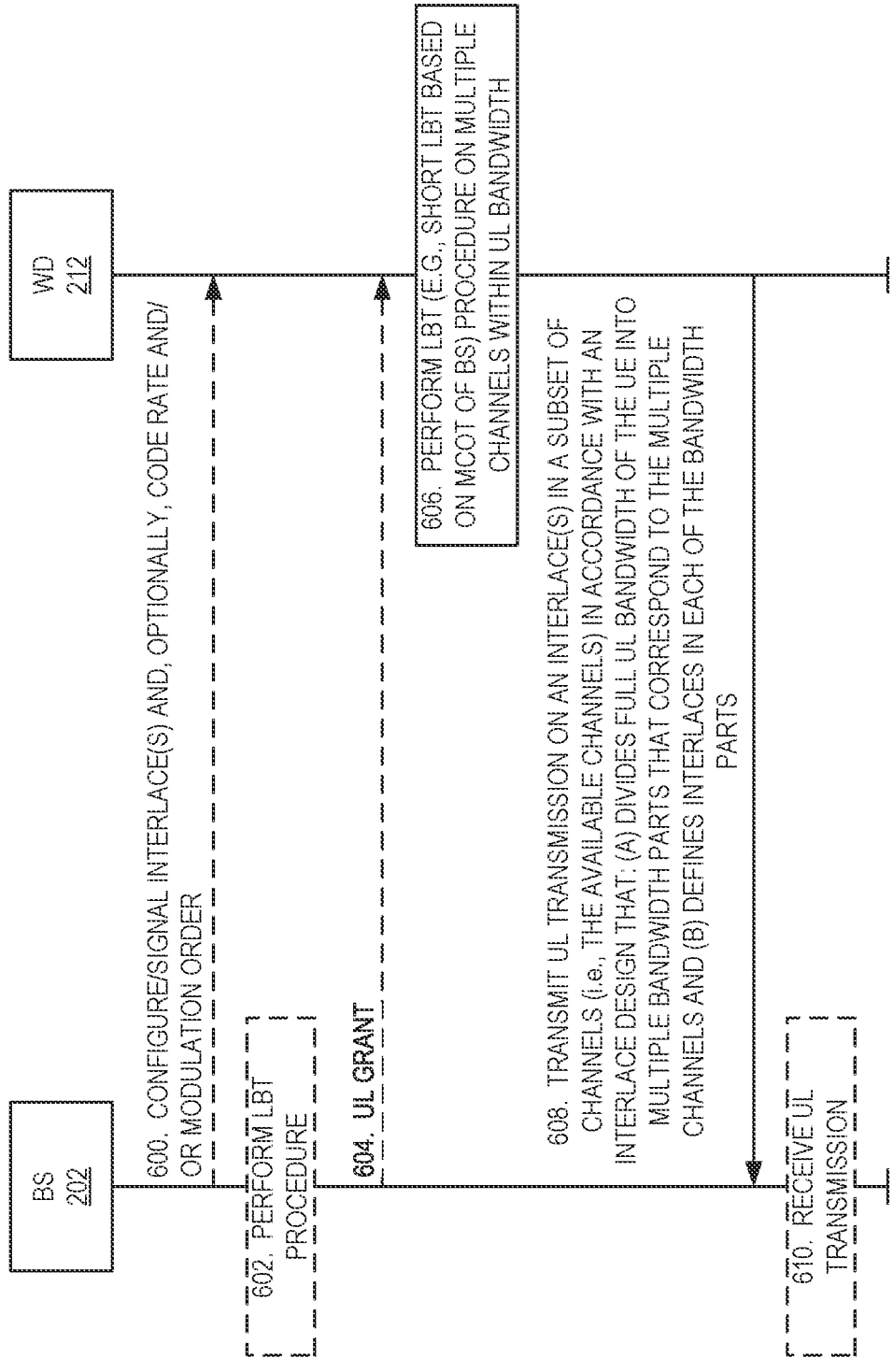
FIG. 6 illustrates the operation of a base station and a wireless device according to some embodiments of the present disclosure.

FIG. 6 illustrates the operation of a base station 202 (e.g., a gNB) and a wireless device 212 (e.g., a UE) according to some embodiments of the present disclosure. In this example, one or more of embodiments A1 through A7 are utilized. This example is also applicable to a low power node 206. Optional steps are represented by dashed lines. Further, while the steps are illustrated as being performed in a particular order, the steps may be performed in any desired order and some steps may be performed in parallel depending on the particular implementation, unless otherwise explicated stated or required.

As illustrated, in some embodiments, the base station 202 configures the wireless device 212 or signals a configuration to the wireless device 212 regarding which interlace(s) to use for an uplink transmission and, in some embodiments, a code rate and/or modulation order for the uplink transmission (step 600). The base station 202 performs a LBT procedure to determine whether one or more channels (e.g., multiple channels including those that correspond to the multiple BWPs of the interlace design) are available for transmission (step 602). In some embodiments, the base station 202 transmits an uplink grant to the wireless device 212 (step 604). Note that the signaling of step 600 may, in some embodiments, be part of the uplink grant. For example, the base station 202 may perform LBT on the multiple channels that correspond to the BWPs of the interlace design and signal to the wireless device 212 an indication of which of the BWPs may be utilized by the wireless device 212 for the uplink transmission.

At the wireless device 212, the wireless device 212 performs a LBT procedure on multiple channels within the uplink bandwidth of the wireless device 212 (step 606). Using the example of FIG. 3 where there are five BWPs, each corresponding to a different channel, the wireless device 212 performs a LBT procedure for each of those channels to thereby determine whether the channels are available (i.e., free). In some embodiments, the MOOT concept is utilized where the base station 202 shares its channel occupancy with the wireless device 212 for uplink transmission, in which case the LBT procedure is a short LBT procedure.

The wireless device 212 transmits the uplink transmission on an interlace(s) in a subset of the channels (i.e., the available channels or some subset of the available channels) in accordance with an interlace design (step 608). The interlace design is any one of those described above with respect to embodiments A1 to A7. In general, the interlace design divides the full uplink bandwidth of the wireless device 212 into multiple BWPs that correspond to the multiple channels for which LBT was performed. The interlace design also defines multiple interlaces in each of the BWPs. A CA and/or carrier merging scheme is used by the wireless device 212 to transmit the uplink transmission on the appropriate interlace(s) in two or more of the BWPs that correspond to available channels, as described above. Further, in some embodiments, extra resources located in the guard bands between adjacent BWPs can also be used for the uplink transmission.

The base station 202 receives the uplink transmission (step 610).

Figure 7:
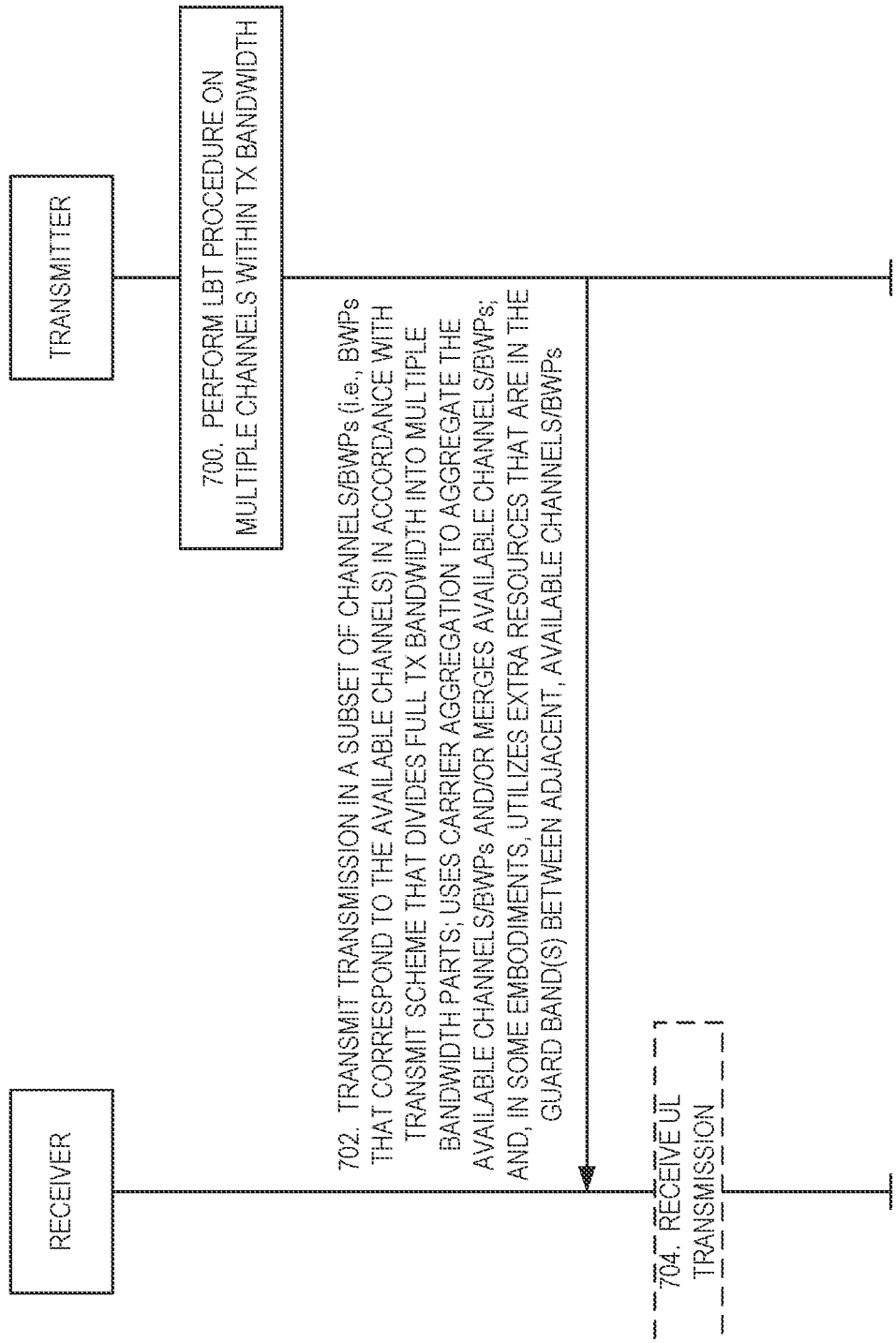
FIG. 7 illustrates the operation of a transmitter (i.e., a transmit node) and a receiver (i.e., a receive node) in accordance with some other embodiments of the present disclosure.

2 Generalization of Embodiments A1-A7 to Uplink or Downlink Transmission with or without Interlacing FIG. 7 illustrates the operation of a transmitter and a receiver in accordance with some other embodiments of the present disclosure. Importantly, the transmitter is also referred to herein as a "transmit node" in order to clearly distinguish the transmitter/transmit node from the transmit circuitry (i.e., the transmit chain(s) including, e.g., upconversion circuitry, filters, power amplifiers, etc.). Likewise, the receiver is also referred to herein as a "receive node" in order to clearly distinguish the receiver/receive node from the receive circuitry (i.e., the receive chain(s) including, e.g., low noise amplifiers, filters, downconversion circuitry, etc.). In some embodiments, the transmitter is the wireless device 212 and the receiver is the base station 202. In some other embodiments, the transmitter is the base station 202 and the receiver is the wireless device 212. In general, the process of FIG. 7 is similar to that of FIG. 6 but where the process is generalized to include either an uplink or downlink transmission with or without interlacing. As such, the process of FIG. 7 also extends at least some of the aspects of embodiments A1-A7 to scenarios in which interlacing is not used. In other words, many of the aspects of embodiments A1-A7 are applicable even without the use of interlacing. Optional steps are represented by dashed lines. Further, while the steps are illustrated as being performed in a particular order, the steps may be performed in any desired order and some steps may be performed in parallel depending on the particular implementation, unless otherwise explicated stated or required.

As illustrated, the transmitter performs a LBT procedure on multiple channels within the transmit bandwidth of the transmitter (step 700). Using the example of FIG. 3 where there are five BWPs, each corresponding to a different channel, the transmitter performs a LBT procedure for each of those channels to thereby determine whether the channels are available (i.e., free). In some embodiments, the LBT procedure is a short LBT procedure (e.g., when the MOOT concept is utilized). In some other embodiments, the LBT procedure is a normal or long LBT procedure.

The transmitter transmits the transmission in a subset of the channels (i.e., in the BWPs that correspond to the available channels or some subset of the available channels) in accordance with a transmit scheme that: (A) uses CA to aggregate the available channels/BWPs used for the transmission and/or merges at least some of the available channels/BWPs to be used for the transmission (step 702). For example, the transmit scheme may merge adjacent available channels/BWPs and, if needed, use CA to aggregate non-adjacent available channels/(merged) BWPs. As another example, the transmit scheme may merge all available channels/BWPs. In addition, in some embodiments, the transmit scheme utilizes at least some of the extra resources in the guard band(s) between adjacent, available channels/ BWPs. CA, carrier merging, and use of extra resources within the guard band(s) between adjacent, available channels/BWPs can be done in any of the manners described above with respect to embodiments A1 to A7, but with or without interlacing. When not using interlacing, the schemes are effectively the same as that described above for embodiments A1 to A7 but where there is only one interlace.

The receiver receives the transmission (step 704).

3 Division of TxOP into Parts

Embodiments are also disclosed herein in which a TxOP is divided into two parts. In the first part of the TxOP after LBT, a fast and simple transmission scheme with unfilled guard band(s) is used. In the second part of the TxOP, a transmission scheme filling the guard band(s) is used.

The wider bandwidth is divided into several BWPs, e.g., as described above. The devices perform LBT per BWP then transmit based on the available BWPs.

In some embodiments, each TxOP is divided into two parts. In the first part of the TxOP, the transmitter transmits transport blocks, which are prepared in advance, on the available BWPs with guard bands between BWPs. In the second part of the TxOP, the transmitter switches to a new transmission mode in which extra resources in the guard bands between adjacent available BWPs are utilized. The transmitter can be the wireless device 212 for uplink embodiments or the base station 202 for downlink embodiments.

In this regard, a number of embodiments are described below relating to the first part of the TxOP and the second part of the TxOP. These embodiments are referred to herein as embodiments B1 through B6. Unless otherwise indicated, these embodiments can be used alone or in any desired combination.

3.1 Embodiment B1

In embodiment B1, in the first part of the TxOP after LBT, the transmitter uses CA transmission. In the second part of the TxOP, the transmitter switches from CA to a carrier merging transmission scheme.

For example, in some embodiments, the transmitter is the wireless device 212, and the wireless device 212 uses a CA transmission scheme in accordance with the interlace design of, e.g., embodiment A1 for the first part of the TxOP. However, other CA transmission schemes may be used for the first part of the TxOP. Further, interlacing may or may not be used. For the second part of the TxOP, the wireless device 212 switches from the CA transmission scheme to a carrier merging scheme (e.g., a carrier merging scheme that uses the interlace design of, e.g., embodiment A2). However, other carrier merging schemes may be used. Further, interlacing may or may not be used. In some embodiments, when using the carrier merging transmission scheme, at least some of the resources in the guard bands(s) between the adjacent, merged BWPs are used for the transmission.

As another example, in some other embodiments, the transmitter is the base station 202, and the base station 202 uses a CA transmission scheme to transmit the data for the first part of the TxOP on the BWPs of the downlink system bandwidth that correspond to the free (i.e., available) channels, as determined by performing a LBT procedure for each of the multiple channels within the downlink system bandwidth. For the second part of the TxOP, the base station 202 switches from the CA transmission scheme to a carrier merging transmission scheme. The carrier merging scheme merges adjacent, available BWPs and then, if needed, uses CA for any non-adjacent, available BWPs, if needed. In some embodiments, when using the carrier merging transmission scheme, at least some of the resources in the guard bands(s) between the adjacent, merged BWPs are used for the transmission.

Figure 8:
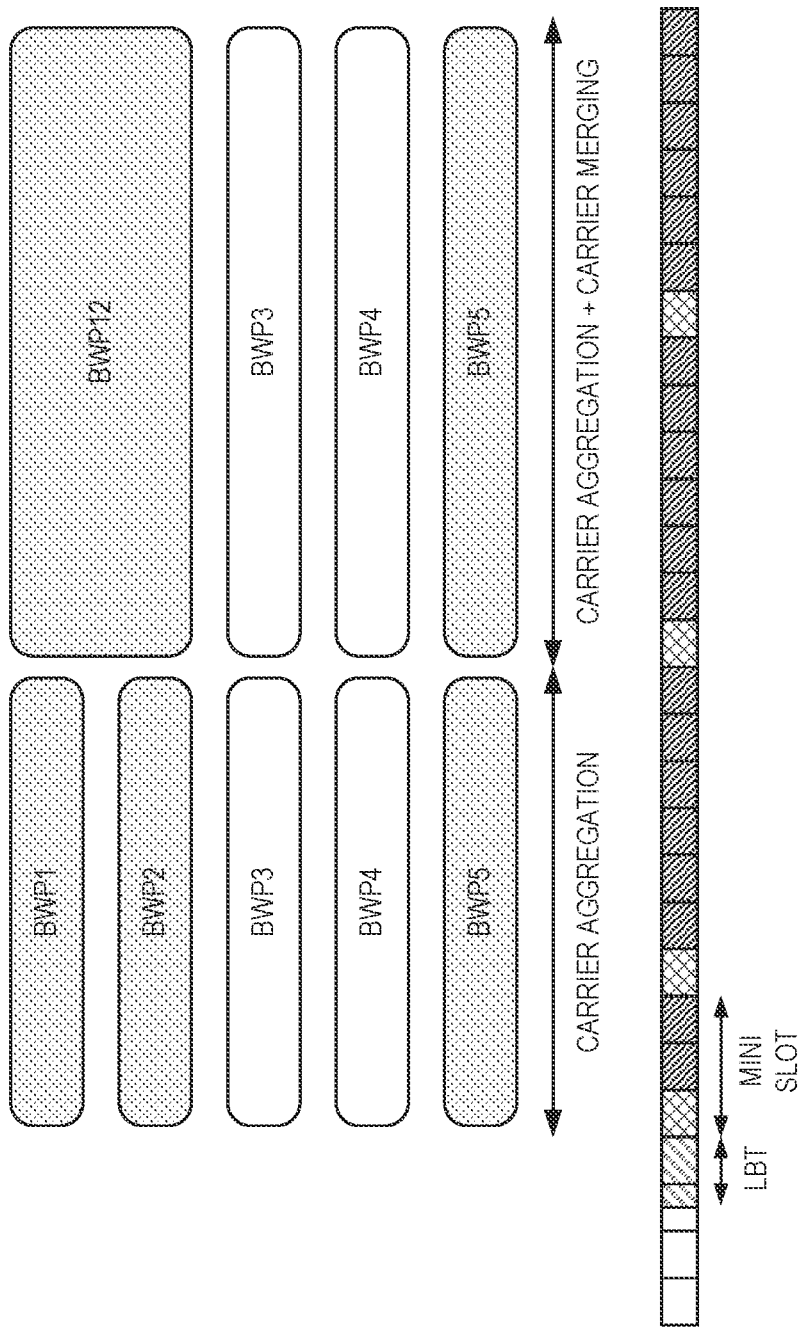
FIGS. 8 through 11 illustrate embodiments of a Transmit Opportunity (TxOP) that is divided into a first part and a second part and respective transmission schemes.

One example of embodiment B1 is illustrated in FIG. 8. In this example, the wireless device 212 uses CA in the first part of the TxOP and uses a combination of CA and carrier merging in the second part of the TxOP. As illustrated in FIG. 8, the transmitter senses the channel free in BWP1, BWP2, and BWP5. The independent transport blocks are prepared and mapped to channels (or BWP or Radio Frequency (RF) chains) in advance (before LBT's outcome is available). After LBT, the transmitter only transmits the transport blocks that were mapped to the free channels (BWPs 1, 2, 5). The other transport blocks will be re-processed and transmitted in the next part of the TxOP.

In the second part of the TxOP, since the LBT's outcome is known at this point in time, the transmitter can adapt and re-process the transport blocks for the subsequent transmissions using the wider bandwidth (BWP12 in FIG. 8) and fill up the unnecessary guard band between contiguous BWPs (the guard band between BWP1 and BWP2 in FIG. 8).

In embodiment B1, non-contiguous BWPs (BWP12 and BWP5 in FIG. 8) are treated as independent channels and the transmissions are done using CA.

The duration of CA transmission in the first part of the TxOP can be preconfigured (using for example Radio Resource Control (RRC) signaling or broadcast information) and depends on the processing capabilities of the transmitter. Another option is that the switch from CA to carrier merging is signaled dynamically to the UE via Downlink Control Information (DCI) carried on Physical Downlink Control Channel (PDCCH) or Medium Access Control (MAC) control information.

3.2 Embodiment B2

Figure 9:
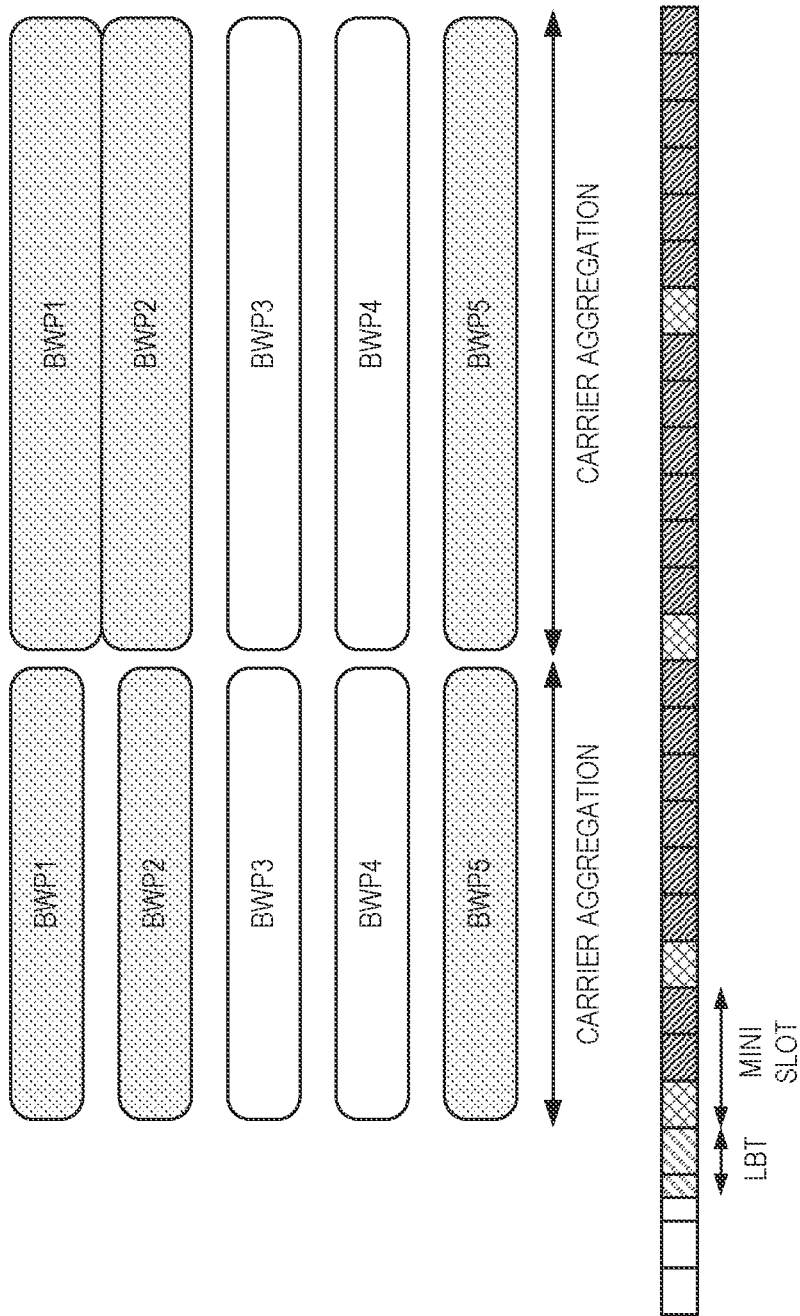

In this embodiment, CA is used throughout the TxOP, but in the second part of the TxOP the transmitter transmits data in the guard bands and the receiver is configured to receive this data as illustrated in FIG. 9. For example, if interlacing is used (e.g., if the transmitter is the wireless device 212), the transmitter may use the interlace design of embodiment A1 without transmitting data in the guard bands in the first part of the TxOP and use the interlace design of embodiment A3 with transmitting data in the guard bands between adjacent available BWPs in the second part of the TxOP. The switching point can be signaled to the receiver in the same way as in embodiment B1. A prerequisite is that the center frequency of the different channels is subcarrier aligned to avoid inter carrier interference between the transmission in the guard band and the adjacent channel.

3.3 Embodiment B3

In embodiment B3, in the first part of the TxOP after LBT, the transmitter uses the CA transmission. In the second part of the TxOP, the transmitter switches to a carrier merging transmission scheme but where carrier merging is used even for non-adjacent BWPs. This can also be understood to be a single wideband carrier transmission scheme. For example, if interlacing is used (e.g., if the transmitter is the wireless device 212), the transmitter may use CA in accordance with the interlace design of embodiment A1 in the first part of the TxOP and carrier merging in accordance with the interlace design of embodiment A2 but where carrier merging is used even for non-adjacent BWPs in the second part of the TxOP. Thus, in the second part of the TxOP, the transmitter uses a single wideband carrier transmission scheme.

Figure 10:
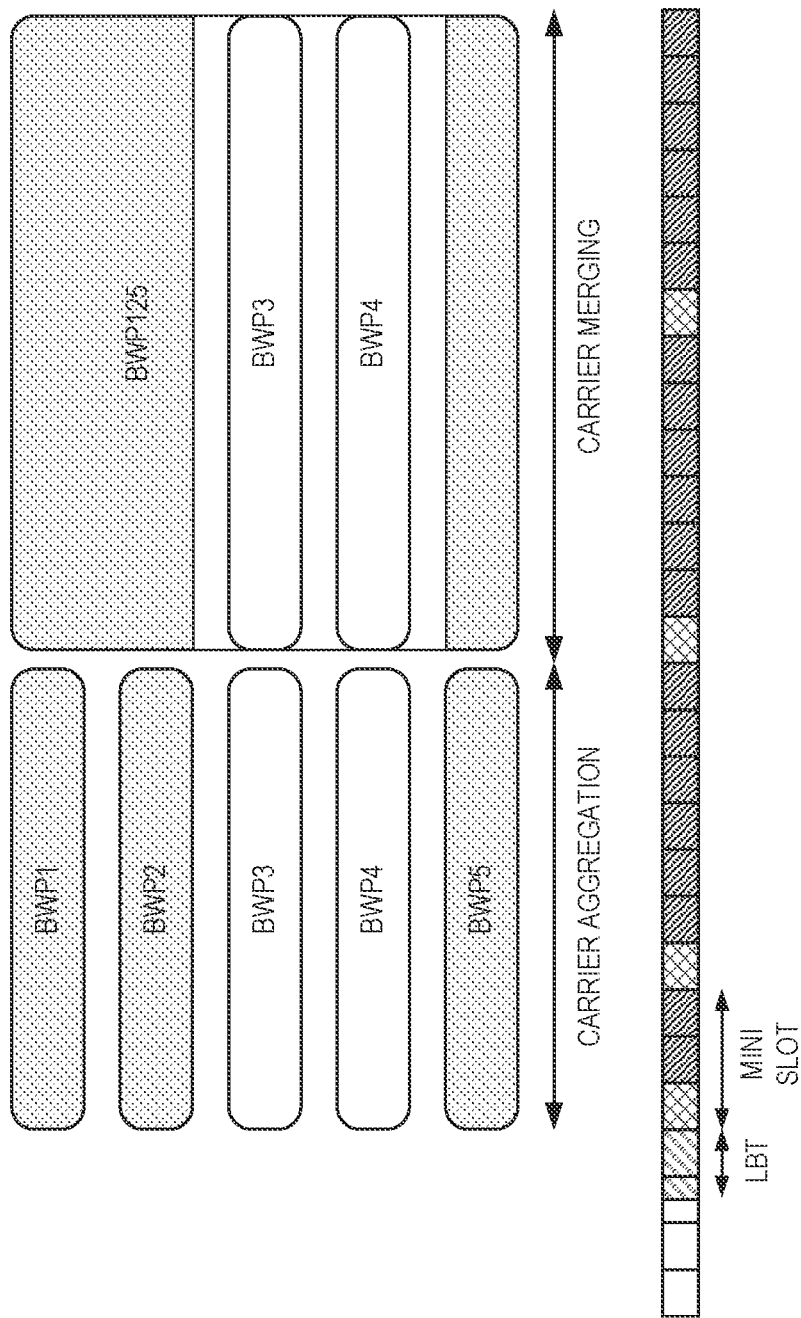

In this embodiment, non-contiguous (i.e., non-adjacent) BWPs (BWP1, BWP2, and BWP5 in FIG. 10) are merged into a wider BWP (BW125 in FIG. 10). By doing this, the transmitter only needs to use a single processing chain operating on a wider bandwidth for the second part of the TxOP. In order to increase the interference filtering capability, multiple processing chains can be used at the receiver in case non-contiguous BWPs are used.

3.4 Embodiment B4

Figure 11:
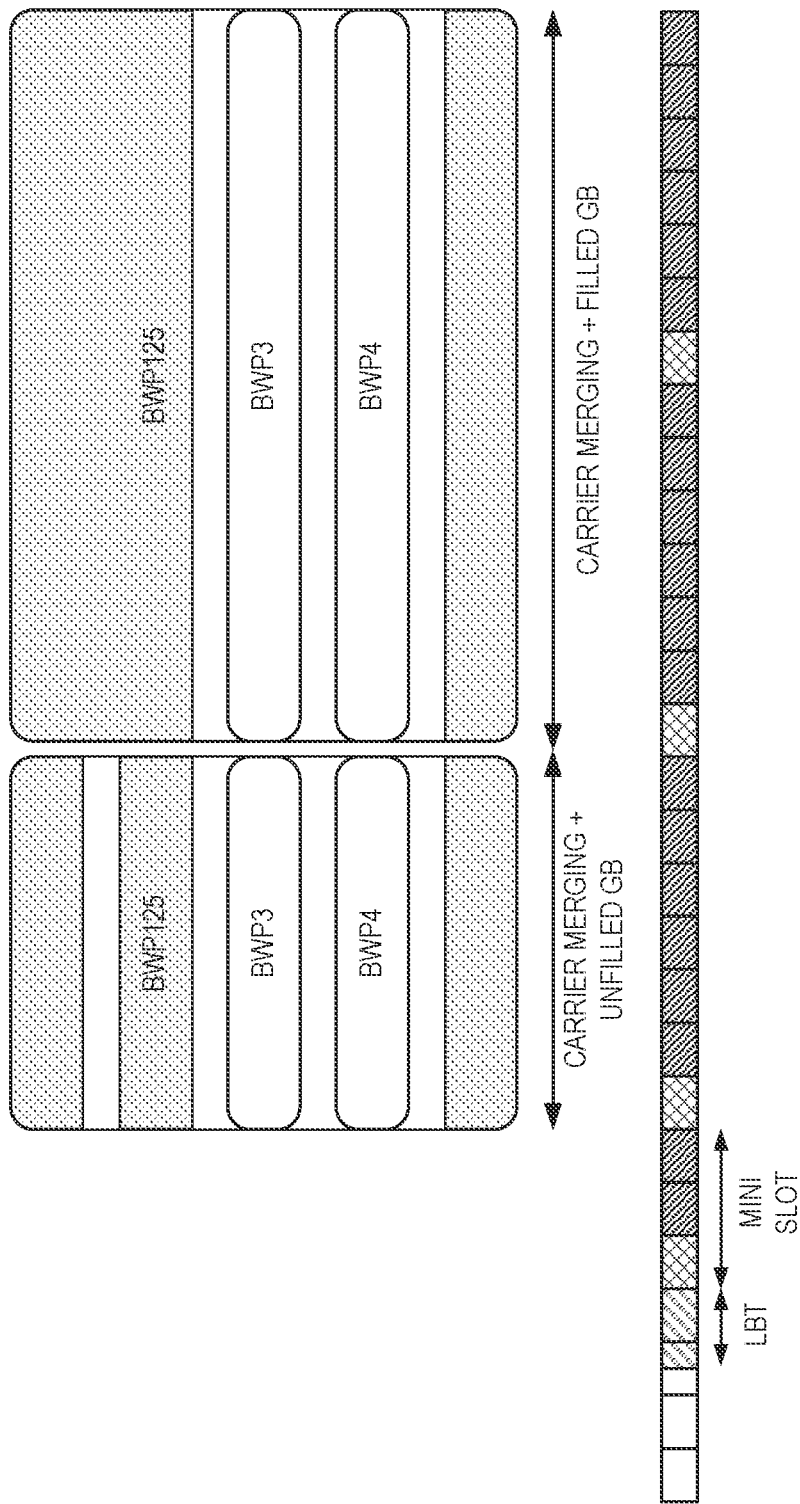

In embodiment B4, carrier merging transmissions are used for both the first and second parts of the TxOP as illustrated in FIG. 11. More specifically, as illustrated in FIG. 11, in both the first and second parts of the TxOP, the transmitter uses a carrier merging transmission scheme but where carrier merging is used even for non-adjacent BWPs. Thus, for both the first and second parts of the TxOP, the transmitter uses a single wideband carrier transmissions scheme. Further, for adjacent BWPs that are used for the transmission, PRBs in the guard bands between those adjacent BWPs are also used.

In this embodiment, code blocks are prepared for all channels (or BWPs) in advance (before the LBT's outcome is available). After LBT, only code blocks, which were prepared for free channels (BWPs 1, 2, 5) are mapped to transport blocks and transmitted. The other code blocks will be re-processed, mapped to transport blocks, and transmitted in the next part of the TxOP.

In order to reduce the processing delay, the code blocks in the first transmission parts are prepared under the assumption that there are guard bands between adjacent BWPs so that the code blocks do not need to be re-processed when non-contiguous BWPs are available. Thus, the unnecessary guard bands are only filled in the second part of the TxOP. There might be a need to use extra guard band or a window function to reduce the leakage to adjacent channels where the LBT failed.

In this embodiment, the transmitter only needs to be equipped with a single processing chain.

3.5 Embodiment B5

In embodiment B5, the maximum supported bandwidth and the timing of the switching point can be preconfigured.

In some embodiments, the maximum supported bandwidth is preconfigured by the gNB. The receiver will then monitor the whole maximum supported bandwidth until it detects the transmission bandwidth (e.g., based on the Demodulation Reference Signal (DMRS) location of the first transmission interval). The receiver will then change the received bandwidth to the transmission bandwidth.

In some embodiments, the timing of the transmission mode switching point can be semi-statically preconfigured, e.g., the second transmission mode used in the second part of the TxOP where unnecessary guard bands are filled will start from the nth transmission interval (n depends on the processing time at the transmitter). The transmitter/receiver will then know when to switch the encoding/decoding modes.

When the period from the nth transmission interval to the end of TxOP is too short (or it even does not exist), the transmitter can be preconfigured to not switch to the second transmission mode. This can happen due to the downlink/uplink shared TxOP or the transmitter only senses the channel free in the end of TxOP.

3.6 Embodiment B6

In embodiment B6, the downlink and uplink share the same TxOP. The following transmission bandwidth can be based on the LBT's outcomes from both sides, i.e., the transmission bandwidth should be the intersection of the available BWPs in both sides. This can help to resolve the hidden node problem without extra signaling. The reason is that the gNB/UEs can get the LBT's outcome in the other side based on the current uplink/downlink transmission bandwidth.

3.7 Examples of Utilizing the Interlace Design of Embodiments B1-B6

Figure 12:
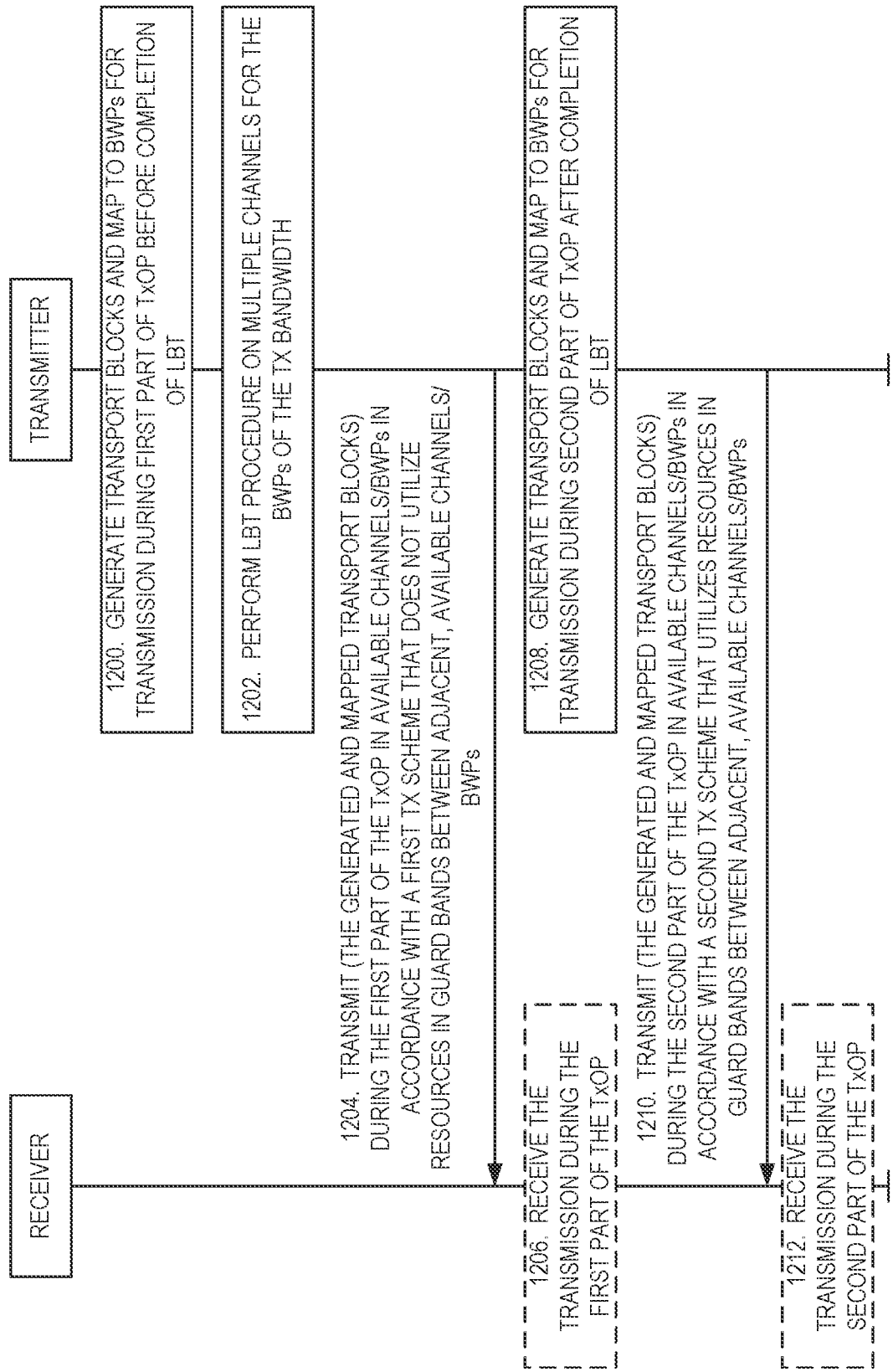
FIG. 12 illustrates the operation of a transmitter (i.e., a transmit node) and a receiver (i.e., a receive node) in accordance with some other embodiments of the present disclosure.

FIG. 12 illustrates the operation of a transmitter and a receiver according to some embodiments of the present disclosure. Importantly, the transmitter is also referred to herein as a "transmit node" in order to clearly distinguish the transmitter/transmit node from the transmit circuitry (i.e., the transmit chain(s) including, e.g., upconversion circuitry, filters, power amplifiers, etc.). Likewise, the receiver is also referred to herein as a "receive node" in order to clearly distinguish the receiver/receive node from the receive circuitry (i.e., the receive chain(s) including, e.g., low noise amplifiers, filters, downconversion circuitry, etc.). In some embodiments, the transmitter is the wireless device 212 and the receiver is the base station 202. In some other embodiments, the transmitter is the base station 202 and the receiver is the wireless device 212. In this example, one or more of embodiments B1 through B6 are utilized. This example is also applicable to a low power node 206. Optional steps are represented by dashed lines. Further, while the steps are illustrated as being performed in a particular order, the steps may be performed in any desired order and some steps may be performed in parallel depending on the particular implementation, unless otherwise explicated stated or required.

As illustrated, the transmitter generates transport blocks for transmission during a first part of a TxOP and maps the transport blocks to multiple BWPs (e.g., all BWPs) of a transmit bandwidth of the transmitter before completion of LBT by the transmitter (step 1200). Note that, as used herein, TxOP refers to a bounded time interval in which the transmitter is permitted to transmit. Also, while transport blocks are used in this example, code blocks may alternatively be used. The transmitter performs a LBT procedure on multiple channels that correspond to the multiple BWPs, as described above (step 1202). The transmitter transmits (the generated and mapped transport blocks) during the first part of the TxOP, but only in the available channels (i.e., in BWPs that correspond to the available channels) in accordance with a first transmit scheme that does not utilize resources within the guard bands between adjacent, available channels/BWPs (step 1204). For example, in embodiments B1, B2, and B3, the first transmit scheme is a transmit scheme that uses CA to transmit (the generated and mapped transport blocks) during the first part of the TxOP in the available BWPs. The receiver receives the transmission during the first part of the TxOP (step 1206).

The transmitter generates transport blocks for transmission during the second part of the TxOP and maps those transport blocks to the available channels/BWPs after completion of LBT (step 1208). Again, while transport blocks are used in this example, code blocks may alternatively be used. The transmitter transmits (the generated and mapped transport blocks) during the second part of the TxOP in the available channels/BWPs in accordance with a second transmit scheme that utilizes at least some of the resources in the guard band(s) between adjacent, available channels/BWPs (step 1210). For example, in embodiment B1, the second transmit scheme is a transmit scheme that uses carrier merging to transmit (the generated and mapped transport blocks) during the second part of the TxOP in the available BWPs. As another example, in embodiment B2, the second transmit scheme is a transmit scheme that uses CA but also uses extra resources within the guard band(s) between adjacent, available BWPs. As another example, in embodiment B3, the second transmit scheme is a transmit scheme that uses carrier merging even for non-adjacent available BWPs. The receiver receives the transmission during the second part of the TxOP (step 1212).

Note that, as another alternative, the transmissions during the first and second parts of the TxOP may be in accordance with embodiment B4 where code blocks are prepared for all channels (or BWPs) in advance (before the LBT outcome is available) and carrier merging transmissions are utilized for both parts.

Figure 13:
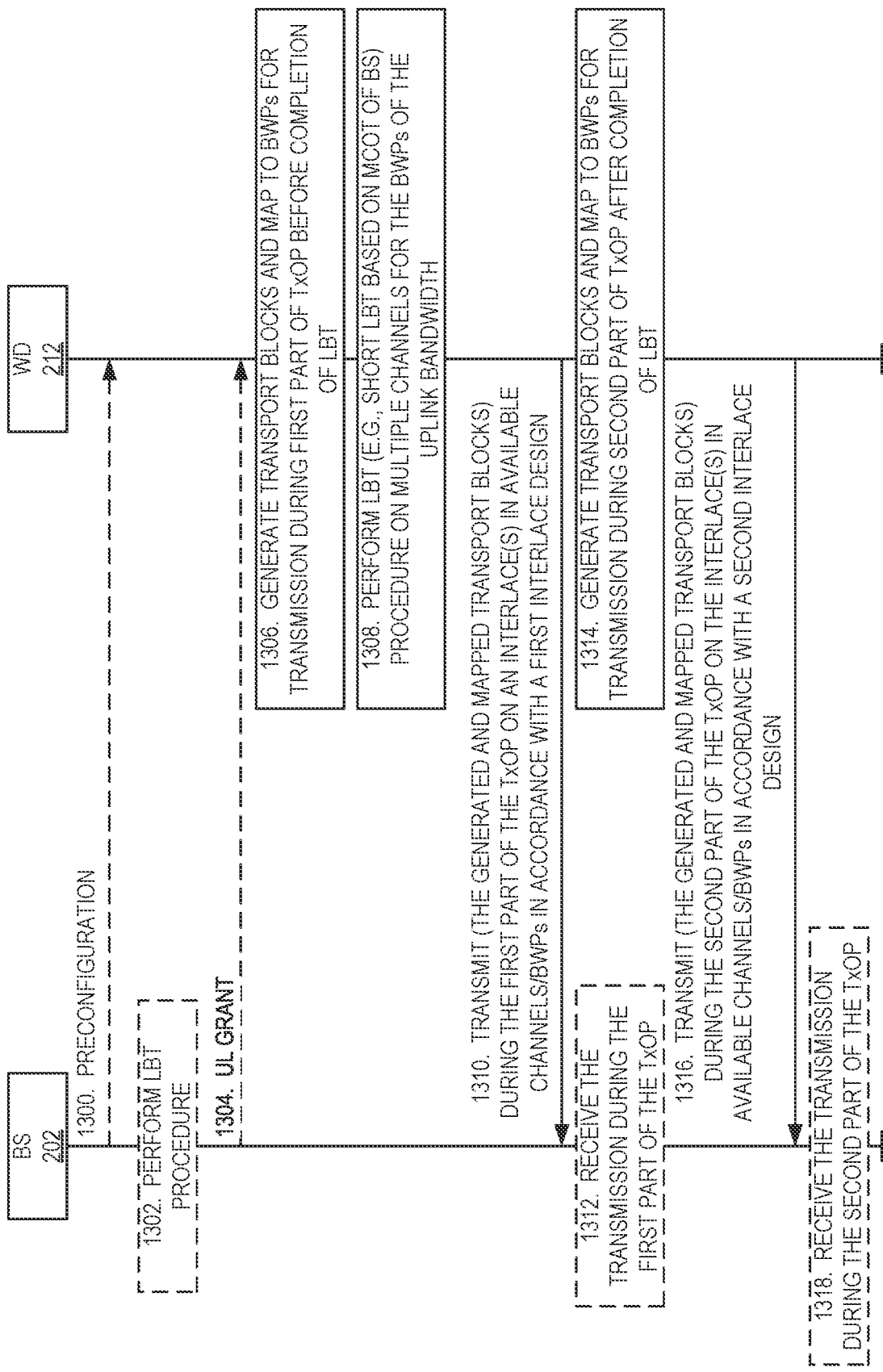
FIG. 13 illustrates the operation of a base station and a wireless device according to some embodiments of the present disclosure.

FIG. 13 illustrates the operation of a base station 202 (e.g., a gNB) and a wireless device 212 (e.g., a UE) according to some embodiments of the present disclosure. In this example, one or more of embodiments B1 through B6 are utilized. This example is also applicable to a low power node 206. The process of FIG. 13 is similar to that of FIG. 12 but where the transmitter is the wireless device 212, the receiver is the base station 202, and interlacing is used for the uplink. Optional steps are represented by dashed lines. Further, while the steps are illustrated as being performed in a particular order, the steps may be performed in any desired order and some steps may be performed in parallel depending on the particular implementation, unless otherwise explicated stated or required.

As illustrated, the base station 202 may preconfigure the wireless device 212, e.g., with a maximum uplink bandwidth of the wireless device 212 and/or a timing of a switching point for the first part and second part of a TxOP (step 1300). The base station 202 performs an LBT procedure and transmits an uplink grant (steps 1302 and 1304), as described above.

The wireless device 212 generates transport blocks for transmission during a first part of the TxOP and maps the transport blocks to an interlace(s) within the multiple BWPs of the uplink bandwidth of the wireless device 212 before completion of LBT by the wireless device 212 (step 1306). Again, while transport blocks are used in this example, code blocks may alternatively be used. The wireless device 212 performs a LBT procedure on multiple channels that correspond to the multiple BWPs, as described above (step 1308). The wireless device 212 transmits (the generated and mapped transport blocks) during the first part of the TxOP on the interlace(s) in the available channels (i.e., the available BWPs) in accordance with a first interlace design (step 1310). In other words, the wireless device 212 transmits the generated and mapped transport blocks during the first part of the TxOP on the interlace(s) in the available channels/BWPs in accordance with a first transmit scheme that uses the first interlace design. For example, in embodiments B1, B2, and B3, the first interlace design is an interlace design that uses CA to transmit during the first part of the TxOP on the interlace(s) in the available BWPs. The base station 202 receives the transmission during the first part of the TxOP (step 1312).

The wireless device 212 generates transport blocks for transmission during the second part of the TxOP and maps those transport blocks to the interlace(s) within the available channels (i.e., within the available BWPs) after completion of LBT (step 1314). Again, while transport blocks are used in this example, code blocks may alternatively be used. The wireless device 212 transmits (the generated and mapped transport blocks) during the second part of the TxOP on the interlace(s) in the available channels (i.e., the available BWPs) in accordance with a second interlace design (step 1316). In other words, the wireless device 212 transmits the generated and mapped transport blocks during the second part of the TxOP on the interlace(s) in the available channels/BWPs in accordance with a second transmit scheme that uses the second interlace design. For example, in embodiment B1, the second interlace design is an interlace design that uses carrier merging to transmit during the second part of the TxOP on the interlace(s) in the available BWPs (e.g., the interlace design of embodiment A2). As another example, in embodiment B2, the second interlace design is an interlace design that uses CA but also uses extra resources within the guard band(s) between adjacent available BWPs. As another example, in embodiment B3, the second interlace design is an interlace design that uses carrier merging even for non-adjacent available BWPs. The base station 202 receives the transmission during the second part of the TxOP (step 1318).

Note that, as another alternative, transmissions during the first and second parts of the TxOP may be in accordance with embodiment B4 where code blocks (or alternatively transport blocks) are prepared for all channels (or BWPs) in advance (before LBT outcome is available) and carrier merging transmissions are utilized for both parts.

4 Additional Details

Figure 14:
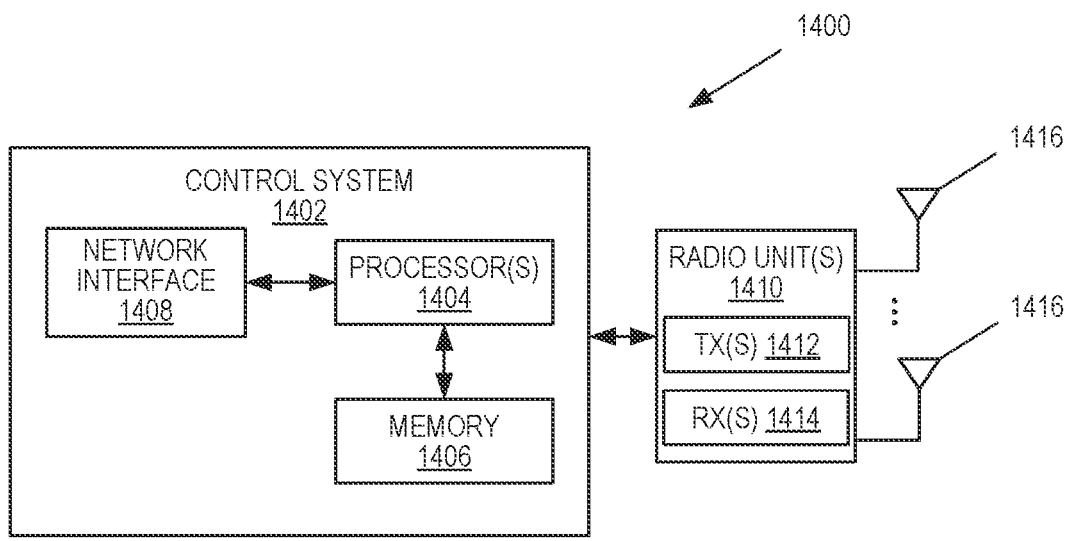
FIGS. 14 through 16 illustrate example embodiments of a radio access node (e.g., a base station)

FIG. 14 is a schematic block diagram of a radio access node 1400 according to some embodiments of the present disclosure. The radio access node 1400 may be, for example, a base station 202 or 206. As illustrated, the radio access node 1400 includes a control system 1402 that includes one or more processors 1404 (e.g., Central Processing Units (CPUs), Application Specific Integrated Circuits (ASICs), Field Programmable Gate Arrays (FPGAs), and/or the like), memory 1406, and a network interface 1408. In addition, the radio access node 1400 includes one or more radio units 1410 that each includes one or more transmitters 1412 and one or more receivers 1414 coupled to one or more antennas 1416. In some embodiments, the radio unit(s) 1410 is external to the control system 1402 and connected to the control system 1402 via, e.g., a wired connection (e.g., an optical cable). However, in some other embodiments, the radio unit(s) 1410 and potentially the antenna(s) 1416 are integrated together with the control system 1402. The one or more processors 1404 operate to provide one or more functions of a radio access node 1400 as described herein. In some embodiments, the function(s) are implemented in software that is stored, e.g., in the memory 1406 and executed by the one or more processors 1404.

Figure 15:
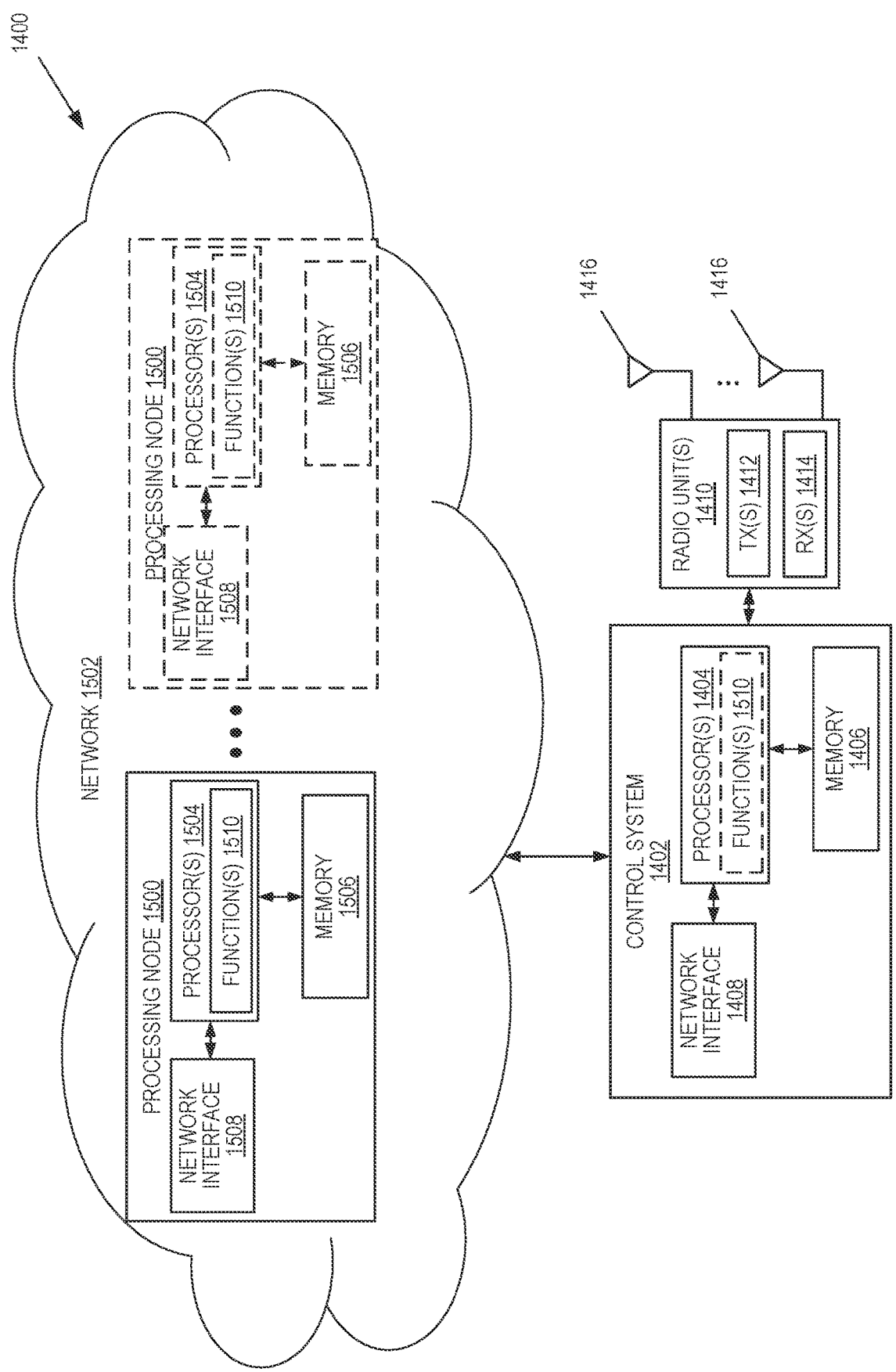

FIG. 15 is a schematic block diagram that illustrates a virtualized embodiment of the radio access node 1400 according to some embodiments of the present disclosure. This discussion is equally applicable to other types of network nodes. Further, other types of network nodes may have similar virtualized architectures.

As used herein, a "virtualized" radio access node is an implementation of the radio access node 1400 in which at least a portion of the functionality of the radio access node 1400 is implemented as a virtual component(s) (e.g., via a virtual machine(s) executing on a physical processing node (s) in a network(s)). As illustrated, in this example, the radio access node 1400 includes the control system 1402 that includes the one or more processors 1404 (e.g., CPUs, ASICs, FPGAs, and/or the like), the memory 1406, and the network interface 1408 and the one or more radio units 1410 that each includes the one or more transmitters 1412 and the one or more receivers 1414 coupled to the one or more antennas 1416, as described above. The control system 1402 is connected to the radio unit(s) 1410 via, for example, an optical cable or the like. The control system 1402 is connected to one or more processing nodes 1500 coupled to or included as part of a network(s) 1502 via the network interface 1408. Each processing node 1500 includes one or more processors 1504 (e.g., CPUs, ASICs, FPGAs, and/or the like), memory 1506, and a network interface 1508.

In this example, functions 1510 of the radio access node 1400 described herein are implemented at the one or more processing nodes 1500 or distributed across the control system 1402 and the one or more processing nodes 1500 in any desired manner. In some particular embodiments, some or all of the functions 1510 of the radio access node 1400 described herein are implemented as virtual components executed by one or more virtual machines implemented in a virtual environment(s) hosted by the processing node(s) 1500. As will be appreciated by one of ordinary skill in the art, additional signaling or communication between the processing node(s) 1500 and the control system 1402 is used in order to carry out at least some of the desired functions 1510. Notably, in some embodiments, the control system 1402 may not be included, in which case the radio unit(s) 1410 communicate directly with the processing node(s) 1500 via an appropriate network interface(s).

In some embodiments, a computer program including instructions which, when executed by at least one processor, causes the at least one processor to carry out the functionality of radio access node 1400 or a node (e.g., a processing node 1500) implementing one or more of the functions 1510 of the radio access node 1400 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 16:
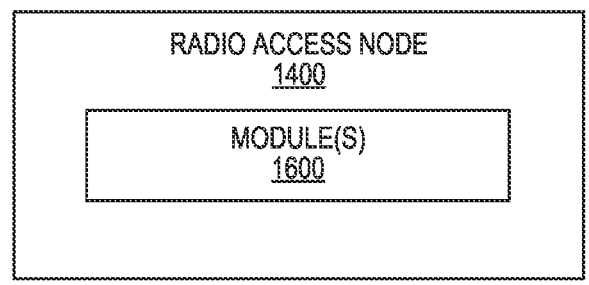

FIG. 16 is a schematic block diagram of the radio access node 1400 according to some other embodiments of the present disclosure. The radio access node 1400 includes one or more modules 1600, each of which is implemented in software. The module(s) 1600 provide the functionality of the radio access node 1400 described herein. This discussion is equally applicable to the processing node 1500 of FIG. 15 where the modules 1600 may be implemented at one of the processing nodes 1500 or distributed across multiple processing nodes 1500 and/or distributed across the processing node(s) 1500 and the control system 1402.

Figure 17:
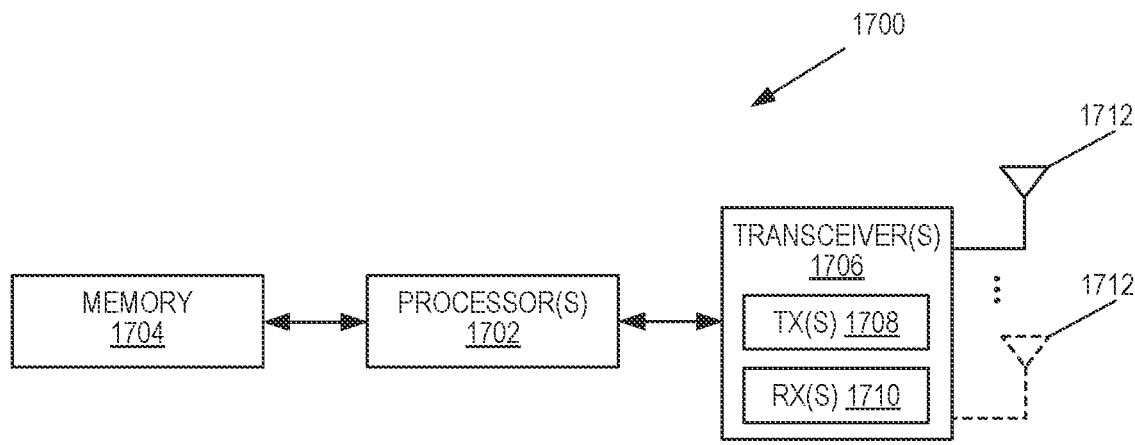
FIGS. 17 and 18 illustrate example embodiments of a wireless device.

FIG. 17 is a schematic block diagram of a UE 1700 according to some embodiments of the present disclosure. As illustrated, the UE 1700 includes one or more processors 1702 (e.g., CPUs, ASICs, FPGAs, and/or the like), memory 1704, and one or more transceivers 1706 each including one or more transmitters 1708 and one or more receivers 1710 coupled to one or more antennas 1712. In some embodiments, the functionality of the UE 1700 described above may be fully or partially implemented in software that is, e.g., stored in the memory 1704 and executed by the processor(s) 1702.

In some embodiments, a computer program including instructions which, when executed by at least one processor, causes the at least one processor to carry out the functionality of the UE 1700 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 18:
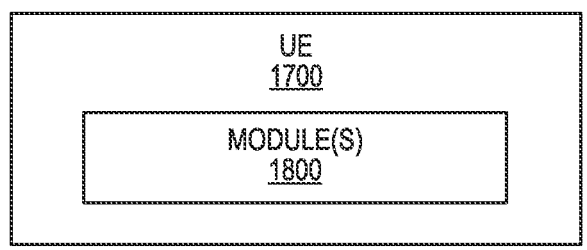

FIG. 18 is a schematic block diagram of the UE 1700 according to some other embodiments of the present disclosure. The UE 1700 includes one or more modules 1800, each of which is implemented in software. The module(s) 1800 provide the functionality of the UE 1700 described herein.

Figure 19:
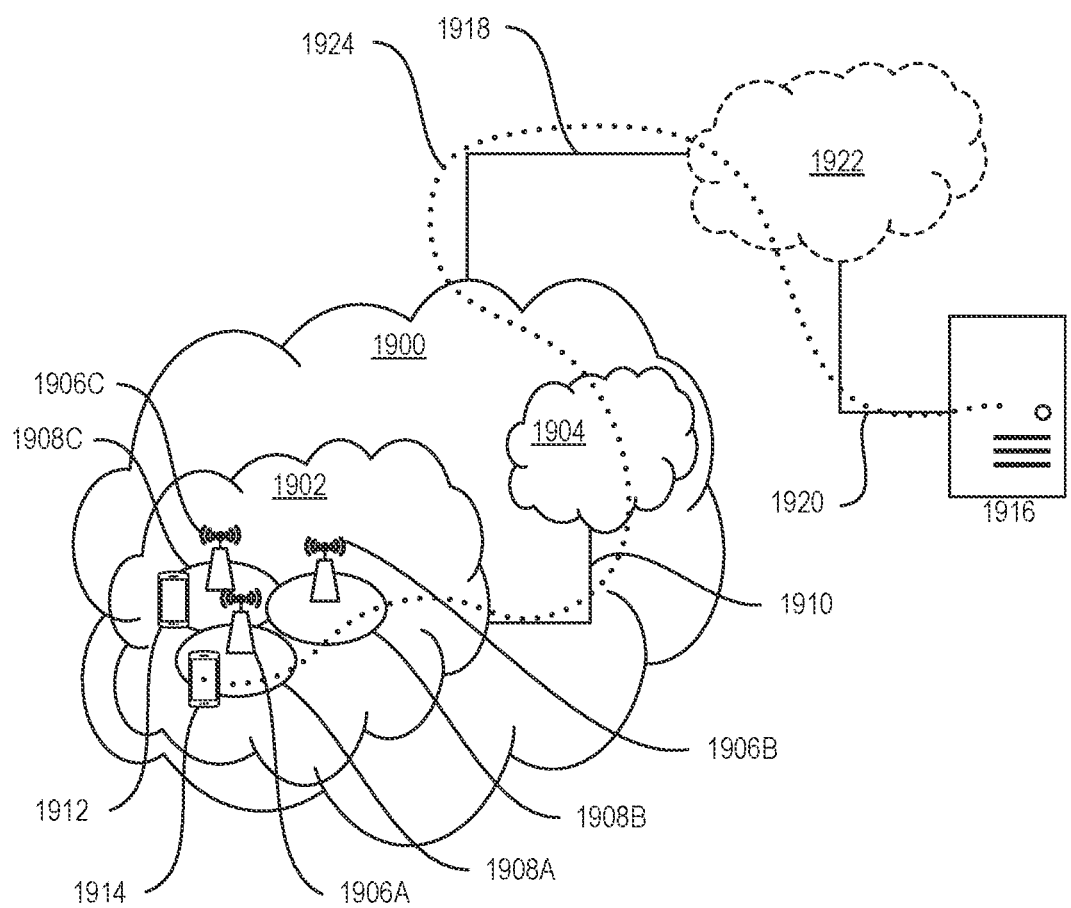
FIG. 19 illustrates a communication system in accordance with some embodiments of the present disclosure.

With reference to FIG. 19, in accordance with an embodiment, a communication system includes a telecommunication network 1900, such as a 3GPP-type cellular network, which comprises an access network 1902, such as a RAN, and a core network 1904. The access network 1902 comprises a plurality of base stations 1906A, 19068, 1906C, such as Node Bs, eNBs, gNBs, or other types of wireless Access Points (APs), each defining a corresponding coverage area 1908A, 1908B, 1908C. Each base station 1906A, 1906B, 1906C is connectable to the core network 1904 over a wired or wireless connection 1910. A first UE 1912 located in coverage area 1908C is configured to wirelessly connect to, or be paged by, the corresponding base station 1906C. A second UE 1914 in coverage area 1908A is wirelessly connectable to the corresponding base station 1906A. While a plurality of UEs 1912, 1914 are illustrated in this example, the disclosed embodiments are equally applicable to a situation where a sole UE is in the coverage area or where a sole UE is connecting to the corresponding base station 1906.

The telecommunication network 1900 is itself connected to a host computer 1916, which may be embodied in the hardware and/or software of a standalone server, a cloud-implemented server, a distributed server, or as processing resources in a server farm. The host computer 1916 may be under the ownership or control of a service provider, or may be operated by the service provider or on behalf of the service provider. Connections 1918 and 1920 between the telecommunication network 1900 and the host computer 1916 may extend directly from the core network 1904 to the host computer 1916 or may go via an optional intermediate network 1922. The intermediate network 1922 may be one of, or a combination of more than one of, a public, private, or hosted network; the intermediate network 1922, if any, may be a backbone network or the Internet; in particular, the intermediate network 1922 may comprise two or more sub-networks (not shown).

The communication system of FIG. 19 as a whole enables connectivity between the connected UEs 1912, 1914 and the host computer 1916. The connectivity may be described as an Over-the-Top (OTT) connection 1924. The host computer 1916 and the connected UEs 1912, 1914 are configured to communicate data and/or signaling via the OTT connection 1924, using the access network 1902, the core network 1904, any intermediate network 1922, and possible further infrastructure (not shown) as intermediaries. The OTT connection 1924 may be transparent in the sense that the participating communication devices through which the OTT connection 1924 passes are unaware of routing of uplink and downlink communications. For example, the base station 1906 may not or need not be informed about the past routing of an incoming downlink communication with data originating from the host computer 1916 to be forwarded (e.g., handed over) to a connected UE 1912. Similarly, the base station 1906 need not be aware of the future routing of an outgoing uplink communication originating from the UE 1912 towards the host computer 1916.

Example implementations, in accordance with an embodiment, of the UE, base station, and host computer discussed in the preceding paragraphs will now be described with reference to FIG. 20. In a communication system 2000, a host computer 2002 comprises hardware 2004 including a communication interface 2006 configured to set up and maintain a wired or wireless connection with an interface of a different communication device of the communication system 2000. The host computer 2002 further comprises processing circuitry 2008, which may have storage and/or processing capabilities. In particular, the processing circuitry 2008 may comprise one or more programmable processors, ASICs, FPGAs, or combinations of these (not shown) adapted to execute instructions. The host computer 2002 further comprises software 2010, which is stored in or accessible by the host computer 2002 and executable by the processing circuitry 2008. The software 2010 includes a host application 2012. The host application 2012 may be operable to provide a service to a remote user, such as a UE 2014 connecting via an OTT connection 2016 terminating at the UE 2014 and the host computer 2002. In providing the service to the remote user, the host application 2012 may provide user data which is transmitted using the OTT connection 2016.

The communication system 2000 further includes a base station 2018 provided in a telecommunication system and comprising hardware 2020 enabling it to communicate with the host computer 2002 and with the UE 2014. The hardware 2020 may include a communication interface 2022 for setting up and maintaining a wired or wireless connection with an interface of a different communication device of the communication system 2000, as well as a radio interface 2024 for setting up and maintaining at least a wireless connection 2026 with the UE 2014 located in a coverage area (not shown in FIG. 20) served by the base station 2018. The communication interface 2022 may be configured to facilitate a connection 2028 to the host computer 2002. The connection 2028 may be direct or it may pass through a core network (not shown in FIG. 20) of the telecommunication system and/or through one or more intermediate networks outside the telecommunication system. In the embodiment shown, the hardware 2020 of the base station 2018 further includes processing circuitry 2030, which may comprise one or more programmable processors, ASICs, FPGAs, or combinations of these (not shown) adapted to execute instructions. The base station 2018 further has software 2032 stored internally or accessible via an external connection.

The communication system 2000 further includes the UE 2014 already referred to. The UE's 2014 hardware 2034 may include a radio interface 2036 configured to set up and maintain a wireless connection 2026 with a base station serving a coverage area in which the UE 2014 is currently located. The hardware 2034 of the UE 2014 further includes processing circuitry 2038, which may comprise one or more programmable processors, ASICs, FPGAs, or combinations of these (not shown) adapted to execute instructions. The UE 2014 further comprises software 2040, which is stored in or accessible by the UE 2014 and executable by the processing circuitry 2038. The software 2040 includes a client application 2042. The client application 2042 may be operable to provide a service to a human or non-human user via the UE 2014, with the support of the host computer 2002. In the host computer 2002, the executing host application 2012 may communicate with the executing client application 2042 via the OTT connection 2016 terminating at the UE 2014 and the host computer 2002. In providing the service to the user, the client application 2042 may receive request data from the host application 2012 and provide user data in response to the request data. The OTT connection 2016 may transfer both the request data and the user data. The client application 2042 may interact with the user to generate the user data that it provides.

Figure 20:
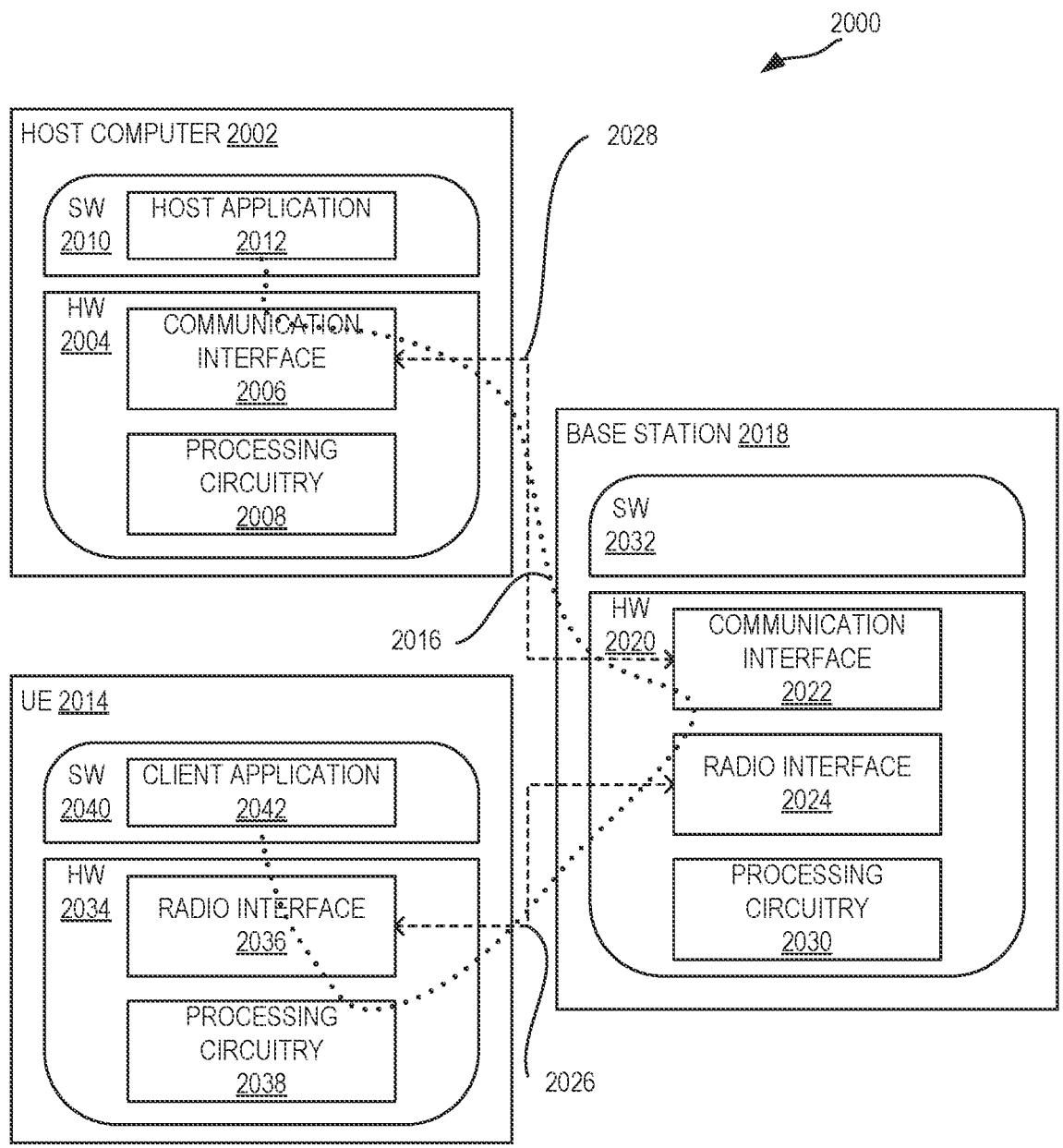
FIG. 20 illustrates a User Equipment device (UE), a base station, and a host computer in accordance with some embodiments of the present disclosure.

It is noted that the host computer 2002, the base station 2018, and the UE 2014 illustrated in FIG. 20 may be similar or identical to the host computer 1916, one of the base stations 1906A, 1906B, 1906C, and one of the UEs 1912, 1914 of FIG. 19, respectively. This is to say, the inner workings of these entities may be as shown in FIG. 20 and independently, the surrounding network topology may be that of FIG. 19.

In FIG. 20, the OTT connection 2016 has been drawn abstractly to illustrate the communication between the host computer 2002 and the UE 2014 via the base station 2018 without explicit reference to any intermediary devices and the precise routing of messages via these devices. The network infrastructure may determine the routing, which may be configured to hide from the UE 2014 or from the service provider operating the host computer 2002, or both. While the OTT connection 2016 is active, the network infrastructure may further take decisions by which it dynamically changes the routing (e.g., on the basis of load balancing consideration or reconfiguration of the network).

The wireless connection 2026 between the UE 2014 and the base station 2018 is in accordance with the teachings of the embodiments described throughout this disclosure. One or more of the various embodiments improve the performance of OTT services provided to the UE 2014 using the OTT connection 2016, in which the wireless connection 2026 forms the last segment. More precisely, the teachings of these embodiments may improve, e.g., data rate and/or latency and thereby provide benefits such as, e.g., reduced user waiting time, relaxed restriction on file size, and/or better responsiveness.

A measurement procedure may be provided for the purpose of monitoring data rate, latency, and other factors on which the one or more embodiments improve. There may further be an optional network functionality for reconfiguring the OTT connection 2016 between the host computer 2002 and the UE 2014, in response to variations in the measurement results. The measurement procedure and/or the network functionality for reconfiguring the OTT connection 2016 may be implemented in the software 2010 and the hardware 2004 of the host computer 2002 or in the software 2040 and the hardware 2034 of the UE 2014, or both. In some embodiments, sensors (not shown) may be deployed in or in association with communication devices through which the OTT connection 2016 passes; the sensors may participate in the measurement procedure by supplying values of the monitored quantities exemplified above, or supplying values of other physical quantities from which the software 2010, 2040 may compute or estimate the monitored quantities. The reconfiguring of the OTT connection 2016 may include message format, retransmission settings, preferred routing, etc.; the reconfiguring need not affect the base station 2014, and it may be unknown or imperceptible to the base station 2014. Such procedures and functionalities may be known and practiced in the art. In certain embodiments, measurements may involve proprietary UE signaling facilitating the host computer 2002's measurements of throughput, propagation times, latency, and the like. The measurements may be implemented in that the software 2010 and 2040 causes messages to be transmitted, in particular empty or 'dummy' messages, using the OTT connection 2016 while it monitors propagation times, errors, etc.

FIG. 21 is a flowchart illustrating a method implemented in a communication system, in accordance with one embodiment. The communication system includes a host computer, a base station, and a UE which may be those described with reference to FIGS. 19 and 20. For simplicity of the present disclosure, only drawing references to FIG. 21 will be included in this section. In step 2100, the host computer provides user data. In sub-step 2102 (which may be optional) of step 2100, the host computer provides the user data by executing a host application. In step 2104, the host computer initiates a transmission carrying the user data to the UE. In step 2106 (which may be optional), the base station transmits to the UE the user data which was carried in the transmission that the host computer initiated, in accordance with the teachings of the embodiments described throughout this disclosure. In step 2108 (which may also be optional), the UE executes a client application associated with the host application executed by the host computer.

FIG. 22 is a flowchart illustrating a method implemented in a communication system, in accordance with one embodiment. The communication system includes a host computer, a base station, and a UE which may be those described with reference to FIGS. 19 and 20. For simplicity of the present disclosure, only drawing references to FIG. 22 will be included in this section. In step 2200 of the method, the host computer provides user data. In an optional sub-step (not shown) the host computer provides the user data by executing a host application. In step 2202, the host computer initiates a transmission carrying the user data to the UE. The transmission may pass via the base station, in accordance with the teachings of the embodiments described throughout this disclosure. In step 2204 (which may be optional), the UE receives the user data carried in the transmission.

FIG. 23 is a flowchart illustrating a method implemented in a communication system, in accordance with one embodiment. The communication system includes a host computer, a base station, and a UE which may be those described with reference to FIGS. 19 and 20. For simplicity of the present disclosure, only drawing references to FIG. 23 will be included in this section. In step 2300 (which may be optional), the UE receives input data provided by the host computer. Additionally or alternatively, in step 2302, the UE provides user data. In sub-step 2304 (which may be optional) of step 2300, the UE provides the user data by executing a client application. In sub-step 2306 (which may be optional) of step 2302, the UE executes a client application which provides the user data in reaction to the received input data provided by the host computer. In providing the user data, the executed client application may further consider user input received from the user. Regardless of the specific manner in which the user data was provided, the UE initiates, in sub-step 2308 (which may be optional), transmission of the user data to the host computer. In step 2310 of the method, the host computer receives the user data transmitted from the UE, in accordance with the teachings of the embodiments described throughout this disclosure.

FIG. 24 is a flowchart illustrating a method implemented in a communication system, in accordance with one embodiment. The communication system includes a host computer, a base station, and a UE which may be those described with reference to FIGS. 19 and 20. For simplicity of the present disclosure, only drawing references to FIG. 24 will be included in this section. In step 2400 (which may be optional), in accordance with the teachings of the embodiments described throughout this disclosure, the base station receives user data from the UE. In step 2402 (which may be optional), the base station initiates transmission of the received user data to the host computer. In step 2404 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments are as follows:

Group A Embodiments

Embodiment 1: A method performed by a transmitter to perform a transmission in a frequency spectrum requiring Listen-Before-Talk, LBT, comprising:
  performing (700) a LBT procedure for a plurality of channels within a transmit bandwidth of the transmitter, the transmit bandwidth being divided into a plurality of bandwidth parts that correspond to the plurality of channels; and
  transmitting (702) a transmission in a subset of the plurality of bandwidth parts that correspond to a subset of the plurality of channels determined, based on a result of the LBT procedure performed for the plurality of channels, to be available, wherein transmitting the transmission comprises transmitting the transmission in accordance with a transmit scheme that:
    uses carrier aggregation and/or carrier merging to transmit the transmission on the subset of the plurality of bandwidth parts; and uses resources in a guard band(s) between two (or more) adjacent bandwidth parts from among the subset of the plurality of bandwidth parts.

Embodiment 2: The method of embodiment 1 wherein the subset of the plurality of channels comprises at least two channels, and transmitting the transmission in the subset of the plurality of bandwidth parts comprises transmitting the transmission in the subset of the plurality of bandwidth parts in accordance with a carrier aggregation scheme.

Embodiment 3: The method of embodiment 1 wherein the subset of the plurality of channels comprises at least two adjacent channels from the plurality of channels, and transmitting the transmission in the subset of the plurality of bandwidth parts comprises transmitting the transmission in at least two adjacent bandwidth parts that correspond to the at least two adjacent channels in accordance with a carrier merging scheme that merges the at least two adjacent bandwidth parts and utilizes at least some resources in a guard band(s) between the at least two adjacent bandwidth parts.

Embodiment 4: The method of embodiment 1 wherein the subset of the plurality of channels comprises at least two adjacent channels from the plurality of channels, and transmitting the transmission in the subset of the plurality of bandwidth parts comprises transmitting the transmission in at least two adjacent bandwidth parts that correspond to the at least two adjacent channels in accordance with a carrier merging scheme that merges the at least two adjacent bandwidth parts and utilizes at least some resources in a guard band(s) between the at least two adjacent bandwidth parts that are allocated to at least one interlace on which the transmission is to be transmitted.

Embodiment 5: The method of embodiment 3 or 4 wherein the subset of the plurality of channels further comprises at least one channel from the plurality of channels that is not adjacent to the at least two adjacent channels, and transmitting the transmission in the subset of the plurality of bandwidth parts further comprises transmitting the transmission in: (a) at least two adjacent bandwidth parts that correspond to the at least two adjacent channels which are merged in accordance with a carrier merging scheme and (b) at least one bandwidth part that corresponds to the at least one channel that is not adjacent to the at least two adjacent bandwidth parts, in accordance with a carrier aggregation scheme.

Embodiment 6: The method of embodiment 1 wherein the subset of the plurality of channels comprises at least two adjacent channels from the plurality of channels, and transmitting the transmission in the subset of the plurality of bandwidth parts comprises transmitting the transmission in at least two adjacent bandwidth parts that correspond to the at least two adjacent channels in accordance with a carrier aggregation scheme that utilizes at least some resources in a guard band(s) between the at least two adjacent bandwidth parts.

Embodiment 7: The method of embodiment 1 wherein the subset of the plurality of channels comprises at least two adjacent channels from the plurality of channels, and transmitting the transmission in the subset of the plurality of bandwidth parts comprises transmitting the transmission in at least two adjacent bandwidth parts that correspond to the at least two adjacent channels in accordance with a carrier aggregation scheme that utilizes at least some resources in a guard band(s) between the at least two adjacent bandwidth parts that are allocated to at least one interlace on which the transmission is to be transmitted.

Embodiment 8: The method of embodiment 1 wherein the transmit scheme utilizes an interlace design that defines multiple interlaces in each of the plurality of bandwidth parts, and resources in at least one of the guard bands allocated for a particular interlace are assigned to the same wireless device that is occupying the corresponding interlace within the plurality of bandwidth parts.

Embodiment 9: The method of any one of embodiments 1 to 8 wherein the transmit scheme utilizes an interlace design that defines multiple interlaces in each of the plurality of bandwidth parts, and the interlace design offsets a central frequency for at least one of the plurality of bandwidth parts such that there is subcarrier level alignment between the plurality of interlaces on the plurality of bandwidth parts.

Embodiment 10: The method of any one of embodiments 1 to 9 wherein, when generating the transmission, a Fast Fourier Transform, FFT, size that can support the transmit bandwidth of the transmitter is used for all possible outcomes of the LBT procedure for the plurality of channels.

Embodiment 11: The method of any one of embodiments 1 to 10 wherein a maximum supported bandwidth of the transmitter is preconfigured for the transmitter or signaled to the transmitter.

Embodiment 12: The method of any one of embodiments 1 to 11 wherein the transmitter is a wireless device, and the method further comprises receiving, from a network node, signaling of a code rate, modulation order, and the at least one interlace to be used for the uplink transmission.

Embodiment 13: The method of embodiment 12 further comprising adapting a transport block size for the uplink transmission based on the number of available channels as determined by the LBT procedure performed for the plurality of channels and/or whether extra resources in the guard band(s) between adjacent available channels are to be used for the uplink transmission.

Embodiment 14: The method performed by a transmitter to perform transmission in a frequency spectrum requiring Listen-Before-Talk, LBT, comprising: performing (1202) a LBT procedure for a plurality of channels within a transmit bandwidth of the transmitter, the transmit bandwidth being divided into a plurality of bandwidth parts that correspond to the plurality of channels; transmitting (1204) during a first part of a TxOP in a subset of the plurality of bandwidth parts that correspond to a subset of the plurality of channels determined, based on a result of the LBT procedure performed for the plurality of channels, to be available, wherein transmitting during the first part of the TxOP comprises transmitting during the first part of the TxOP in accordance with a first transmit scheme that does not utilize resources within guard bands between adjacent bandwidth parts; and transmitting (1210) during a second part of the TxOP in the subset of the plurality of bandwidth parts, wherein transmitting during the second part of the TxOP comprises transmitting during the second part of the TxOP in accordance with a second transmit scheme that utilizes resources within one or more guard bands between two or more of the subset of the plurality of bandwidth parts that are adjacent to one another.

Embodiment 15: The method of embodiment 14 wherein the first transmit scheme and the second transmit scheme utilize interlace designs that define a plurality of interlaces in each of the plurality of bandwidth parts.

Embodiment 16: The method of embodiment 14 or 15 wherein the first transmit scheme is a carrier aggregation scheme utilized to transmit during the first part of the TxOP in the subset of the plurality of bandwidth parts that correspond to the subset of the plurality of channels determined to be available.

Embodiment 17: The method of embodiment 16 wherein the second transmit scheme is a combination of a carrier aggregation scheme and a carrier merging scheme utilized to transmit during the second part of the TxOP in the subset of the plurality of bandwidth parts that correspond to the subset of the plurality of channels determined to be available and the resources within the one or more guard bands between the two or more of the subset of the plurality of bandwidth parts that are adjacent to one another.

Embodiment 18: The method of embodiment 16 wherein the second transmit scheme is a carrier merging scheme utilized to transmit during the second part of the TxOP in the subset of the plurality of bandwidth parts that correspond to the subset of the plurality of channels determined to be available.

Embodiment 19: The method of any one of embodiments 14 to 18 further comprising, prior to completing the LBT procedure, generating transport blocks for transmission during the first part of the TxOP and mapping the transport blocks for transmission during the first part of the TxOP to the plurality of bandwidth parts.

Embodiment 20: The method of embodiment 19 further comprising, after completing the LBT procedure, generating transport blocks for transmission during the second part of the TxOP and mapping the transport blocks for transmission during the second part of the TxOP to the subset of the plurality of bandwidth parts that correspond to the subset of the plurality of channels determined to be available.

Embodiment 21: The method of embodiment 14 further comprising, prior to completing the LBT procedure, generating code blocks for transmission during both the first part of the TxOP and the second part of the TxOP and mapping the code blocks to the plurality of bandwidth parts, wherein the first transmit scheme and the second transmit scheme utilize carrier merging or a combination of carrier aggregation and carrier merging to transmit during the respective part of the TxOP in the subset of the plurality of bandwidth parts that correspond to the subset of the plurality of channels determined to be available.

Embodiment 22: The method of any one of embodiments 14 to 21 wherein a timing of a switch point between the first part of the TxOP and the second part of the TxOP is preconfigured.

Embodiment 23: The method of any of the previous embodiments, further comprising: providing user data; and forwarding the user data to a host computer via the transmission to the base station.

Group B Embodiments

Embodiment 24: A method performed by a receiver to receive a transmission in a frequency spectrum requiring Listen-Before-Talk, LBT, comprising: receiving, from a transmitter, a transmission in a subset of a plurality of bandwidth parts of a transmit bandwidth of the transmitter that correspond to a subset of a plurality of channels within the transmit bandwidth of the transmitter determined by the transmitter, based on a result of an LBT procedure performed by the transmitter for the plurality of channels, to be available, wherein receiving the transmission comprises receiving the transmission in accordance with a transmit scheme utilized by the transmitter, where the transmit scheme utilizes carrier aggregation and/or carrier merging to transmit the transmission on the subset of the plurality of bandwidth parts and utilizes resources in a guard band(s) between two (or more) adjacent bandwidth parts from among the subset of the plurality of bandwidth parts.

Embodiment 25: The method of embodiment 24 further comprising preconfiguring the transmitter or signaling a configuration to the transmitter within one or more parameters that indicate at least one interlace to be used by the transmitter for transmission of the transmitter.

Embodiment 26: The method of embodiment 24 or 25 further comprising performing a LBT procedure for a set of channels comprising the plurality of channels within the transmit bandwidth of the transmitter to thereby determine two or more available channels from among the plurality of channels within the transmit bandwidth of the transmitter and signaling, to the transmitter, an indication of the two or more available channels.

Embodiment 27: The method of any one of embodiments 24 to 26 wherein the transmission shares a channel occupancy of an associated transmission from the receiver.

Embodiment 28: A method performed by a receiver to receive a transmission in a frequency spectrum requiring Listen-Before-Talk, LBT, comprising: receiving, from a transmitter, during a first part of a TxOP in a subset of a plurality of bandwidth parts of a transmit bandwidth of the transmitter that correspond to a subset of a plurality of channels within the transmit bandwidth of the transmitter determined by the transmitter, based on a result of the LBT procedure performed by the transmitter for the plurality of channels, to be available, wherein transmission during the first part of the TxOP by the transmitter is in accordance with a first transmit scheme that does not utilize resources within guard bands between adjacent bandwidth parts; and receiving, from the transmitter, during a second part of the TxOP in the subset of the plurality of bandwidth parts, wherein transmission during the second part of the TxOP by the transmitter is in accordance with a second transmit scheme that utilizes resources within one or more guard bands between two or more of the subset of the plurality of bandwidth parts that are adjacent to one another.

Embodiment 29: The method of embodiment 28 further comprising signaling, to the transmitter, an indication of a timing of a switch point between the first part of the TxOP and the second part of the TxOP.

Embodiment 30: The method of any of the previous embodiments, further comprising: obtaining user data; and forwarding the user data to a host computer or a wireless device.

Group C Embodiments

Embodiment 31: A wireless device comprising: processing circuitry configured to perform any of the steps of any of the Group A embodiments or any of the Group B embodiments; and power supply circuitry configured to supply power to the wireless device.

Embodiment 32: A base station comprising: processing circuitry configured to perform any of the steps of any of the Group A embodiments or any of the Group B embodiments; and power supply circuitry configured to supply power to the base station.

Embodiment 33: A User Equipment, UE, comprising: an antenna configured to send and receive wireless signals; transceiver circuitry connected to the antenna and to processing circuitry, and configured to condition signals communicated between the antenna and the processing circuitry;

the processing circuitry being configured to perform any of the steps of any of the Group A embodiments or any of the Group B embodiments.

Embodiment 34: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group A embodiments.

Embodiment 35: The communication system of the previous embodiment further including the base station.

Embodiment 36: The communication system of the previous 2 embodiments, further including the UE, wherein the UE is configured to communicate with the base station.

Embodiment 37: The communication system of the previous 3 embodiments, wherein: the processing circuitry of the host computer is configured to execute a host application, thereby providing the user data; and the UE comprises processing circuitry configured to execute a client application associated with the host application.

Embodiment 38: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group A embodiments.

Embodiment 39: The method of the previous embodiment, further comprising, at the base station, transmitting the user data.

Embodiment 40: The method of the previous 2 embodiments, wherein the user data is provided at the host computer by executing a host application, the method further comprising, at the UE, executing a client application associated with the host application.

Embodiment 41: A User Equipment, UE, configured to communicate with a base station, the UE comprising a radio interface and processing circuitry configured to perform the method of the previous 3 embodiments.

Embodiment 42: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group B embodiments.

Embodiment 43: The communication system of the previous embodiment, wherein the cellular network further includes a base station configured to communicate with the UE.

Embodiment 44: The communication system of the previous 2 embodiments, wherein: the processing circuitry of the host computer is configured to execute a host application, thereby providing the user data; and the UE's processing circuitry is configured to execute a client application associated with the host application.

Embodiment 45: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group B embodiments.

Embodiment 46: The method of the previous embodiment, further comprising at the UE, receiving the user data from the base station.

Embodiment 47: A communication system including a host computer comprising: a communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 48: The communication system of the previous embodiment, further including the UE.

Embodiment 49: The communication system of the previous 2 embodiments, further including the base station, wherein the base station comprises a radio interface configured to communicate with the UE and a communication interface configured to forward to the host computer the user data carried by a transmission from the UE to the base station.

Embodiment 50: The communication system of the previous 3 embodiments, wherein: the processing circuitry of the host computer is configured to execute a host application; and the UE's processing circuitry is configured to execute a client application associated with the host application, thereby providing the user data.

Embodiment 51: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 52: A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 53: The method of the previous embodiment, further comprising, at the UE, providing the user data to the base station.

Embodiment 54: The method of the previous 2 embodiments, further comprising: at the UE, executing a client application, thereby providing the user data to be transmitted; and at the host computer, executing a host application associated with the client application.

Embodiment 55: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 56: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 57: The communication system of the previous embodiment further including the base station.

Embodiment 58: The communication system of the previous 2 embodiments, further including the UE, wherein the UE is configured to communicate with the base station.

Embodiment 59: The communication system of the previous 3 embodiments, wherein: the processing circuitry of the host computer is configured to execute a host application; and the UE is configured to execute a client application associated with the host application, thereby providing the user data to be received by the host computer.

Embodiment 60: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 61: The method of the previous embodiment, further comprising at the base station, receiving the user data from the UE.

Embodiment 62: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

µm Microsecond
3GPP Third Generation Partnership Project
5G Fifth Generation
AP Access Point
ASIC Application Specific Integrated Circuit
BI-FDMA Block Interleaved Frequency Division Multiple Access
BRAN Broadband Radio Access Network
BWP Bandwidth Part
CA Carrier Aggregation
CP Cyclic Prefix
CPU Central Processing Unit
CRC Cyclic Redundancy Check
D2D Device-to-Device
dBm Decibel-Milliwatt
DCI Downlink Control Information
DMRS Demodulation Reference Signal
DSP Digital Signal Processor
EIRP Equivalent Isotropic Radiated Power
eNB Enhanced or Evolved Node B
ETSI European Telecommunications Standards Institute
FFT Fast Fourier Transform
FPGA Field Programmable Gate Array
GHz Gigahertz
gNB New Radio Base Station
HARQ Hybrid Automatic Repeat Request
kHz Kilohertz
LBT Listen-Before-Talk
LTE Long Term Evolution
MAC Medium Access Control
MCOT Maximum Channel Occupancy Time
MHz Megahertz
MME Mobility Management Entity
MTC Machine Type Communication
NACK Negative Acknowledgement
NR New Radio
NR-U New Radio Unlicensed
OFDM Orthogonal Frequency Division Multiplexing
OTT Over-the-Top
PDCCH Physical Downlink Control Channel
P-GW Packet Data Network Gateway
PRB Physical Resource Block
PSD Power Spectral Density
RAM Random Access Memory
RAN Radio Access Network
RF Radio Frequency
ROM Read Only Memory
RRC Radio Resource Control
RRH Remote Radio Head
SCEF Service Capability Exposure Function
TxOP Transmit Opportunity
UE User Equipment
ULLCC Ultra-Low Latency Critical Communications Those skilled in the art will recognize improvements and modifications to the embodiments of the present disclosure. All such improvements and modifications are considered within the scope of the concepts disclosed herein.

The invention claimed is:

1. A method performed by a transmit node to perform a transmission in a frequency spectrum requiring Listen-Before-Talk, LBT, comprising:
    performing an LBT procedure for a plurality of channels each comprising a group of contiguous Physical Resource Blocks, PRBs, within a transmit bandwidth of the transmit node to determine that a subset of the plurality of channels is available; and
    transmitting a transmission in the subset of the plurality of channels determined to be available, wherein transmitting the transmission comprises one of:
        transmitting the transmission concurrently on the subset of the plurality of channels independent of whether the subset of the plurality of channels is adjacent;
        merging at least two adjacent channels among the subset of the plurality of channels into a merged channel and transmitting the transmission on the merged channel; and
        merging the at least two adjacent channels among the subset of the plurality of channels into the merged channel and transmitting the transmission concurrently on the merged channel and at least one of the subset of the plurality of channels non-adjacent to the merged channel.

2. The method of claim 1, wherein transmitting the transmission concurrently on the subset of the plurality of channels independent of whether the subset of the plurality of channels is adjacent comprises transmitting the transmission in accordance with a carrier aggregation scheme.

3. The method of claim 1, wherein:
    merging the at least two adjacent channels comprises merging the at least two adjacent channels in accordance with a carrier merging scheme; and
    transmitting the transmission concurrently on the merged channel and the at least one of the subset of the plurality of channels non-adjacent to the merged channel comprises transmitting the transmission in accordance with a carrier aggregation scheme.

4. The method of claim 1, wherein the at least two adjacent channels are separated by a guard band comprising one or more extra PRBs and transmitting the transmission further comprises transmitting the transmission in at least one of the one or more extra PRBs in the guard band.

5. The method of claim 1, wherein the transmit bandwidth is divided into a plurality of bandwidth parts each corresponding to a respective one of the plurality of channels and comprising the group of contiguous PRBs within the transmit bandwidth of the transmit node.

6. The method of claim 5, wherein transmitting the transmission further comprises one of:
- transmitting the transmission concurrently on a subset of the plurality of bandwidth parts independent of whether the subset of the plurality of bandwidth parts is adjacent;
- merging at least two adjacent bandwidth parts among the subset of the plurality of bandwidth parts into a merged bandwidth part and transmitting the transmission on the merged bandwidth part; and
- merging the at least two adjacent bandwidth parts among the subset of the plurality of bandwidth parts into the merged bandwidth part and transmitting the transmission concurrently on the merged bandwidth part and at least one of the subset of the plurality of bandwidth parts non-adjacent to the merged bandwidth part.

7. The method of claim 6, wherein the at least two adjacent bandwidth parts are separated by a guard band comprising one or more extra PRBs and transmitting the transmission further comprises transmitting the transmission in at least one of the one or more extra PRBs in the guard band.

8. The method of claim 1, wherein the transmit bandwidth is divided into a plurality of bandwidth parts each corresponding to two or more of the plurality of channels and comprising the group of contiguous PRBs within the transmit bandwidth of the transmit node.

9. The method of claim 1, wherein the transmit bandwidth is divided into a plurality of bandwidth parts and each of the plurality of channels comprises two or more of the plurality of bandwidth parts.

10. The method of claim 1, wherein each of the plurality of channels is divided into a plurality of interlaces, each of the plurality of interlaces comprising a subset of the group of contiguous PRBs in a respective one of the plurality of channels.

11. A method performed by a transmit node to perform transmission in a frequency spectrum requiring Listen-Before-Talk, LBT, comprising:
- performing an LBT procedure for a plurality of channels each comprising a group of contiguous Physical Resource Blocks, PRBs, within a transmit bandwidth of the transmit node to determine that a subset of the plurality of channels is available; and
- transmitting during a first part and a second part of a Transmit Opportunity, TxOP, in the subset of the plurality of channels determined to be available.

12. The method of claim 11, wherein the subset of the plurality of channels comprises at least two adjacent channels separated by a guard band comprising one or more extra PRBs.

13. The method of claim 12 wherein:
- transmitting during the first part of the TxOP comprises transmitting during the first part of the TxOP in accordance with a first transmit scheme that does not utilize the one or more extra PRBs in the guard band; and
- transmitting during the second part of the TxOP comprises transmitting during the second part of the TxOP in accordance with a second transmit scheme that utilizes the one or more extra PRBs in the guard band.

14. The method of claim 11, wherein the transmit bandwidth is divided into a plurality of bandwidth parts each corresponding to a respective one of the plurality of channels and comprising the group of contiguous PRBs within the transmit bandwidth of the transmit node.

15. The method of claim 14, wherein transmitting during the first part and the second part of the TxOP in the subset of the plurality of channels comprises transmitting during the first part and the second part of the TxOP in the subset of the plurality of bandwidth parts.

16. A wireless device comprising a transmit node for performing a transmission in a frequency spectrum requiring Listen-Before-Talk, LBT, wherein the transmit node comprises:
- at least one transmitter; and
- processing circuitry associated with the at least one transmitter, the processing circuitry configured to cause the transmit node to:
  - perform an LBT procedure for a plurality of channels each comprising a group of contiguous Physical Resource Blocks, PRBs, within a transmit bandwidth of the transmit node to determine that a subset of the plurality of channels is available; and
  - transmit a transmission in the subset of the plurality of channels determined to be available, wherein transmitting the transmission comprises one of:
    - transmitting the transmission concurrently on the subset of the plurality of channels independent of whether the subset of the plurality of channels is adjacent; and
    - merging at least two adjacent channels among the subset of the plurality of channels into a merged channel and transmitting the transmission concurrently on the merged channel and at least one of the subset of the plurality of channels non-adjacent to the merged channel.

17. A method performed by a receiver to receive a transmission in a frequency spectrum requiring Listen-Before-Talk, LBT, comprising:
- receiving, from a transmit node, a transmission in a subset of a plurality of channels each comprising a group of contiguous Physical Resource Blocks, PRBs, within a transmit bandwidth of the transmit node and determined to be available for the transmission, wherein receiving the transmission comprises one of:
  - receiving the transmission concurrently on the subset of the plurality of channels independent of whether the subset of the plurality of channels is adjacent;
  - receiving the transmission on a merged channel comprising at least two adjacent channels among the subset of the plurality of channels; and
  - receiving the transmission concurrently on the merged channel comprising the at least two adjacent channels among the subset of the plurality of channels and at least one of the subset of the plurality of channels non-adjacent to the merged channel.

18. The method of claim 17 further comprising preconfiguring the transmit node or signaling a configuration to the transmit node with one or more parameters that indicate at least one interlace to be used by the transmit node for the transmission of the transmit node.

19. The method of claim 18 further comprising:
- performing an LBT procedure for a set of channels comprising the plurality of channels within the transmit bandwidth of the transmit node to thereby determine two or more available channels from among the plurality of channels within the transmit bandwidth of the transmit node; and
- signaling, to the transmit node, an indication of the two or more available channels.

20. The method of claim 19 wherein the transmission shares a channel occupancy of an associated transmission from the receiver.

* * * * *

UNITED STATES PATENT AND TRADEMARK OFFICE
CERTIFICATE OF CORRECTION

PATENT NO. : 11,792,849 B2
APPLICATION NO. : 17/167502
DATED : October 17, 2023
INVENTOR(S) : Do et al.

It is certified that error appears in the above-identified patent and that said Letters Patent is hereby corrected as shown below:

In the Specification

In Column 12, Line 10, delete "BWPS" and insert -- BWP5 --, therefor.

In Column 12, Line 13, delete "BWPS" and insert -- BWP5 --, therefor.

In Column 15, Line 55, delete "MOOT" and insert -- MCOT --, therefor.

In Column 16, Line 52, delete "MOOT" and insert -- MCOT --, therefor.

In Column 24, Line 27, delete "19068," and insert -- 1906B, --, therefor.

In Column 35, Line 28, delete "μm" and insert -- μs --, therefor.

Signed and Sealed this
Ninth Day of July, 2024

Katherine Kelly Vidal
*Director of the United States Patent and Trademark Office*